United States Patent
Tsuji et al.

(10) Patent No.: US 7,888,274 B2
(45) Date of Patent: Feb. 15, 2011

(54) REINFORCING WOVEN FABRIC AND PROCESS FOR PRODUCING THE SAME

(75) Inventors: Seiji Tsuji, Ehime (JP); Masatoshi Tsukamoto, Ehime (JP); Hidehiro Takemoto, Ehime (JP); Tamotsu Suzuki, Shiga (JP)

(73) Assignee: Toray Industries, Inc. (JP)

( * ) Notice: Subject to any disclaimer, the term of this patent is extended or adjusted under 35 U.S.C. 154(b) by 263 days.

(21) Appl. No.: 11/989,258

(22) PCT Filed: Apr. 13, 2006

(86) PCT No.: PCT/JP2006/307810

§ 371 (c)(1),
(2), (4) Date: Feb. 12, 2008

(87) PCT Pub. No.: WO2007/013204

PCT Pub. Date: Feb. 1, 2007

(65) Prior Publication Data

US 2009/0029612 A1    Jan. 29, 2009

(30) Foreign Application Priority Data

Jul. 29, 2005    (JP) .............................. 2005-220187

(51) Int. Cl.
*B32B 3/00*    (2006.01)
*B32B 5/02*    (2006.01)
*B32B 9/00*    (2006.01)

(52) U.S. Cl. ......................................... 442/59; 442/286
(58) Field of Classification Search ................... 442/59, 442/286
See application file for complete search history.

(56) References Cited

U.S. PATENT DOCUMENTS

| 5,071,711 A | 12/1991 | Heck et al. |
| 5,783,278 A * | 7/1998 | Nishimura et al. ........... 428/102 |
| 2004/0170554 A1 * | 9/2004 | Wadahara et al. ......... 423/447.2 |
| 2004/0241415 A1 * | 12/2004 | Wadahara et al. ......... 428/298.1 |

FOREIGN PATENT DOCUMENTS

| JP | 2-160512 A | 6/1990 |
| JP | 4-261810 A | 9/1992 |
| JP | 10-317247 A | 12/1998 |
| JP | 2002-13040 A | 1/2002 |
| JP | 2002-321215 A | 11/2002 |
| JP | 2004-277479 A | 10/2004 |
| JP | 205-179845 A | 7/2005 |
| JP | 2005-280348 A | 10/2005 |
| WO | WO 03/027417 A1 | 4/2003 |

* cited by examiner

*Primary Examiner*—Norca L Torres-Velazquez
(74) *Attorney, Agent, or Firm*—DLA Piper LLP (US)

(57) ABSTRACT

To provide a reinforcing woven fabric, which is excellent in deformability, capable of following a complicated shape and excellent in retention of the shape, and a preform using it, a fiber reinforced plastic molded component and a process for producing them. Provided is a reinforcing woven fabric where a resin material is stuck on at least one surface of a fabric substrate containing a plurality of reinforcing fiber bundles, then the resin material stuck over two or more reinforcing fiber bundles is peeled from a part of the two or more reinforcing fiber bundles by varying the relative position of a plurality of reinforcing fiber bundles constituting the fabric substrate, wherein the maximum value of load till a tensile strain in a non fiber axial tensile test reaches 1% is in a range of 0.01 to 0.75 N.

9 Claims, 19 Drawing Sheets

REINFORCING WOVEN FABRIC AND PROCESS FOR PRODUCING THE SAME

RELATED APPLICATION

This is a §371 of International Application No. PCT/2006/307810, with an international filing date of Apr. 13, 2006 (WO 2007/013204 A1, published Feb. 1, 2007), which is based on Japanese Patent Application No. 2005-220187, filed Jul. 29, 2005.

TECHNICAL FIELD

This disclosure relates to a reinforcing woven fabric which is good in deformability and easy to shape into a three-dimensional shape, and also has an excellent handling property and shape retention upon shaping into a three-dimensional shape, a preform using it, a fiber reinforced plastic molded component, and a process for producing them.

BACKGROUND ART

A fiber reinforced plastic molded component composed of a continuous reinforcing fiber such as a carbon fiber, glass fiber and aramid fiber, and a cured material of a matrix resin such as an epoxy resin, unsaturated polyester resin, vinyl ester resin and phenol resin shows excellent mechanical properties of strength, elastic modulus, impact resistance and fatigue resistance, and also has a characteristic of being light in weight, so that it is widely used in applications such as aviation, space, sport, automobile, marine vessel, home electric appliance, civil engineering and construction.

In production of the fiber reinforced plastic molded component, there is often used a method where a prepreg, a sheet-like intermediate material in which an uncured thermosetting resin is impregnated in a fabric substrate constituted by a continuous reinforced fiber, is laid up on a molding tool, then pressurized/heated in an autoclave. However, the uncured thermosetting resin impregnated in a prepreg has generally a high viscosity, and the relative position of reinforcing fiber bundles constituting a fabric substrate is constrained by the resin impregnated. Therefore, the prepreg has a high rigidity and low deformability, bad in following a mold and difficult to shape into a three-dimensional shape. This is one cause for hamper of production improvement.

To the above-described problem, an infusing molding method has recently been paid attentions as a method for improving productivity, which is typified by RTM (Resin Transfer Molding) where a reinforcing fiber substrate that a matrix resin is not impregnated in beforehand (so-called dry) is positioned inside a molding tool, then, by infusing a liquid matrix resin with low viscosity, the matrix resin is impregnated in the reinforcing fiber substrate, and cured after that.

In the infusing molding method, generally, it takes procedures where a dry reinforcing fiber substrate that a matrix resin is not impregnated in is laid up on a molding tool so that it follows a shape of mold, which is next covered by a vacuum bagging film or a molding tool, then, a resin is infused therein and cured. Since a dry reinforcing fiber substrate is used in this method, deformability is large and it follows well a three-dimensional shape. However, on the other hand, there is a problem that shape retention is bad, laying-up operations take time, occupying an expensive molding tool for a long time.

To more improve productivity beyond the above-described problems, there is also proposed a method that a laying-up process of reinforcing fiber substrates and an infusion process of resin are separated. Namely, first, it is provided with a shape (near-net-shape), i.e., substantially the same shape as the case of laying up dry reinforcing fiber substrates on a molding tool, and a so-called preform retaining the shape is formed. Thereafter, the preform is placed on a molding tool, in which a matrix resin is infused rapidly without requiring laying-up and shape-providing operations on the molding tool Specifically, for example, in U.S. Pat. No. 5,071,711 and JP 4-261810 A, there is proposed a technique that a surface of a reinforcing fiber substrate is provided with a thermoplastic-like resin or a thermosetting resin, after being laid up in a shaping mold of a given shape, the resin is melt to thermally bond the interlayer of the reinforcing fiber substrate, cooled and solidified to form a preform retained in a given shape. According to these proposals, it is possible to obtain a preform excellent in shape retention by deforming a reinforcing fiber substrate in a given shape and bonding the interlayer.

However, according to these methods, there is an adverse effect that by sticking a resin component onto the surface of a reinforcing fiber substrate before forming a preform, rigidity of the reinforcing fiber substrate becomes strong, deformability is lowered and a shape-following property is deteriorated. Namely, in the case of trying to be deformed into a three-dimensional shape, a reinforcing fiber substrate cannot follow the shape and wrinkle occurs, as a result, the wrinkle of the reinforcing fiber substrate appears on the surface of the molded component obtained by impregnating and curing a matrix resin, which is inferior in the designing property as a commercial product. Besides, there are problems that impregnation deficiency takes place resulting from the wrinkle part occurred in a reinforcing fiber substrate upon infusing a matrix resin, further, the reinforcing fiber substrate is folded or broken at the wrinkle part, thereby the mechanical properties are deteriorated. This phenomenon is particularly notable in the case of using a method that imposes a reinforcing fiber substrate on a shaping mold for providing a shape in order to produce a three-dimensional shape with a large concavity and convexity.

From these facts, it has been strongly desired to provide a reinforcing fiber substrate having an excellent deformability capable of following a complicated shape without generating wrinkle in providing a shape as well as it has an excellent shape retention after providing the shape.

It could therefore be helpful to provide a reinforcing woven fabric having an excellent deformability capable of following a complicated shape and also is excellent in retention of the shape, a preform using it, a fiber reinforced plastic molded component using it, and a process for producing them, thereby to improve the productivity of the fiber reinforced plastic molded component.

SUMMARY

We thus provide:

(1) A reinforcing woven fabric including a resin material stuck on at least one surface of a fabric substrate containing a plurality of reinforcing fiber bundles, wherein the maximum value of load till a tensile strain in a non fiber axial tensile test reaches 1% is in a range of 0.01 to 0.75 N.

(2) The reinforcing woven fabric according to the above-described (1), wherein the maximum value of load till a tensile strain in a non fiber axial tensile test reaches 5% is in a range of 0.1 to 1.0 N.

(3) The reinforcing woven fabric according to the above-described (1) or (2), wherein the stuck amount of the resin material is 1 to 50 g/m².

(4) The reinforcing woven fabric according to any one of the above-described (1) to (3), wherein the resin material mainly comprises a thermoplastic resin.

(5) The reinforcing woven fabric according to any one of the above-described (1) to (4), wherein the fabric substrate is a bidirectional fabric.

(6) The reinforcing woven fabric according to any one of the above-described (1) to (5), wherein the reinforcing fiber bundle is a carbon fiber bundle.

(7) The preform including at least one layer of the reinforcing woven fabric according to any one of the above-described (1) to (6).

(8) The fiber reinforced plastic molded component, wherein a matrix resin is impregnated in the preform according to the above-described (7).

(9) A process for producing a reinforcing woven fabric including: sticking a resin material on at least one surface of a fabric substrate containing a plurality of reinforcing fiber bundles; and then varying the relative position of a plurality of reinforcing fiber bundles constituting the fabric substrate to peel the resin material stuck over two or more reinforcing fiber bundles from a part of the two or more reinforcing fiber bundles.

(10) The process for producing a reinforcing woven fabric according to the above-described (9), wherein by giving the fabric substrate a shearing deformation of 5 to 45°, the relative position of a plurality of reinforcing fiber bundles constituting the fabric substrate is varied.

(11) A process for producing a preform including: laying up a reinforcing woven fabric according to any one of the above-described (1) to (6) and a fabric substrate containing reinforcing fiber bundles into a shaping mold; next, pressurizing and heating the layered product of the reinforcing woven fabric and the fabric substrate to soften the resin material stuck on the reinforcing woven fabric and to bond the interlayer of the layered product.

(12) A process for producing a preform including: laying up a reinforcing woven fabric according to any one of the above-described (1) to (6) into a shaping mold; and then pressurizing and heating the layered product of the reinforcing woven fabric to soften the resin material stuck on the reinforcing woven fabric and to bond the interlayer of the layered product.

(13) The process for producing a preform, according to the above-described (11) or (12), including: positioning the layered product between at least two facing shaping molds; pressurizing a part of the layered product; and then pressurizing and heating the remaining part.

(14) The process for producing a preform, according to the above-described (11) or (12), including: pressurizing a part of a layered product laid up on a shaping mold, then covering a sheet on the layered product, pressurizing and heating the layered product via the sheet by gas or liquid.

(15) A process for producing a fiber reinforced plastic molded component, including: impregnating a matrix resin into a preform produced by the process for producing according to any one of the above-described (11) to (14), and curing or solidifying the matrix resin.

A resin material being "stuck" means a state where in a part where a surface of a reinforcing fiber bundle constituting a fabric substrate contacts a resin material, the resin material penetrates between a plurality of single yarns consisting a reinforcing fiber bundle, and then the reinforcing woven fabric and the resin material are bonded.

The reinforcing woven fabric can be deformed with a good productivity and can retain a shape even if the shape is too complicated to obtain conventionally. Therefore, it is possible to produce a fiber reinforced plastic molded component excellent in a designing property and mechanical property with a good productivity.

Figure 1:
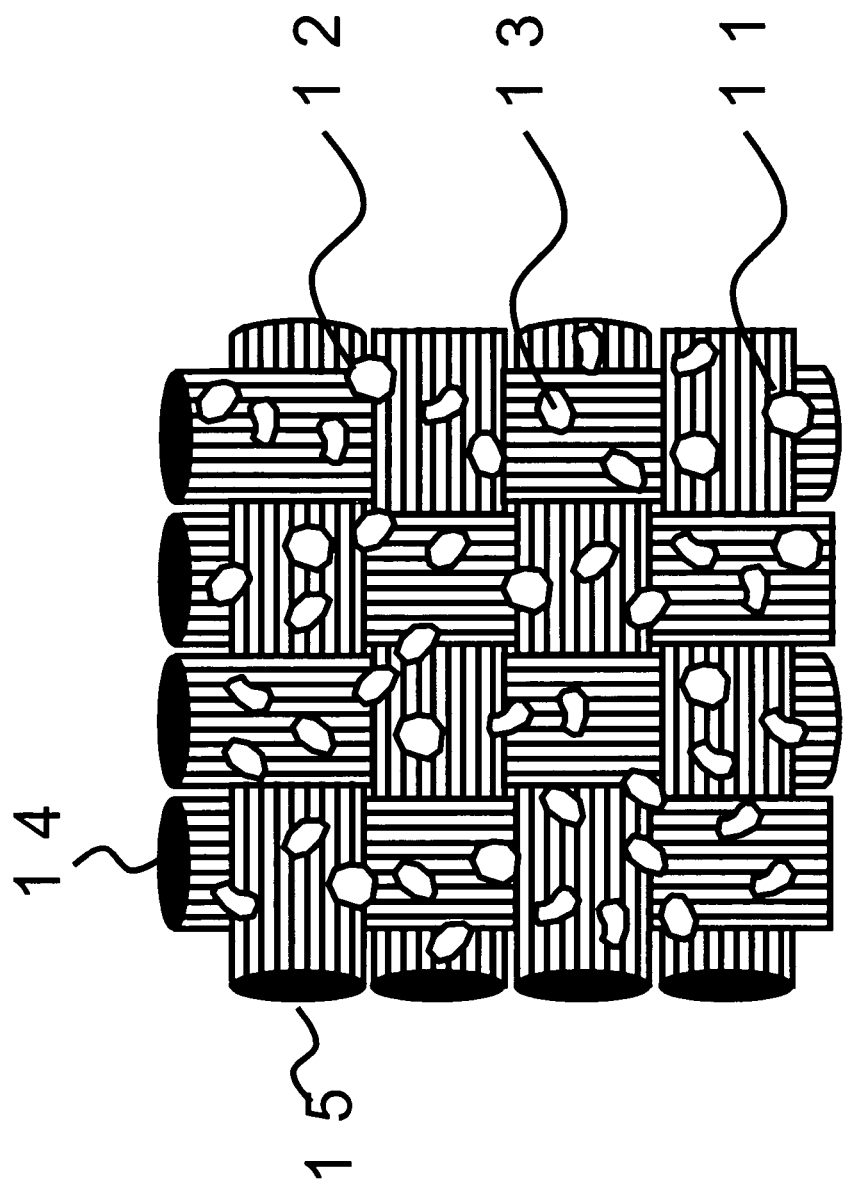
FIG. 1 is a plan pattern view showing a reinforcing woven fabric that sticks a resin material on the surface.
Figure 2:
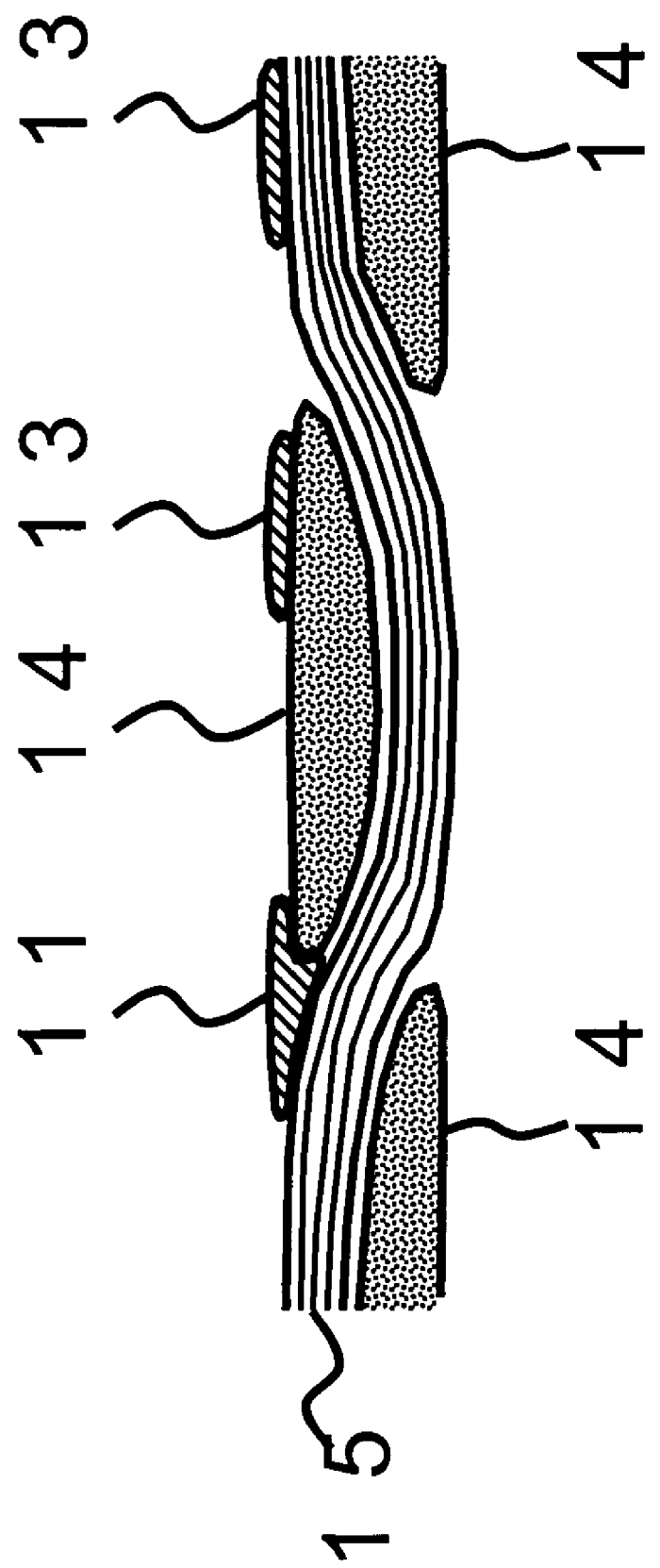
FIG. 2 is a sectional pattern view showing a reinforcing woven fabric that sticks a resin material on the surface.

DESCRIPTION OF REFERENCE NUMERALS 11 resin material stuck over two reinforcing fiber bundles of fabric substrate
12 resin material stuck over three reinforcing fiber bundles of fabric substrate
13 resin material stuck only on one reinforcing fiber bundle of fabric substrate
14 reinforcing fiber bundle constituting fabric substrate (warp)

15 reinforcing fiber bundle constituting fabric substrate (weft)
31 test piece of fabric substrate
41 test piece attaching part
42 test piece of fabric substrate
51 resin material stuck on the surface of fabric substrate
81 resin material stuck only on a part of reinforcing fiber bundle
111 shaping mold (lower mold)
112 shaping mold (upper mold)
113 layered product
121 shaping mold
123 sheet
124 sealer
125 chamber
126 vacuum pump
127 pressurizing device
131 shaping mold (lower mold)
132 shaping mold (upper mold)
133 layered product
134 part mold
135 heating means
141 shaping mold (lower mold)
142 shaping mold (upper mold)
143 layered product
144 movable part capable of projecting
145 heating means
151 shaping mold
152 layered product
153 sheet
154 sealer
155 part mold
156 heater
157 vacuum pump
158 pressurizing device
159 chamber
161 edge holding swing mechanism
162 wind-off mechanism of fabric substrate
163 wind mechanism of fabric substrate
164 fabric substrate
171 nip swing mechanism
181 swing roll
182 delivery roll
θ shearing deformation angle

DETAILED DESCRIPTION

Hereinafter, our fabrics, preforms, components and methods will be explained in detail together with preferable forms.

In the reinforcing woven fabric, a resin material is stuck on at least one surface of a fabric substrate containing a plurality of reinforcing fiber bundles, and the maximum value of load till a tensile strain in a non fiber axial tensile test reaches 1% is in a range of 0.01 to 0.75 N.

A preform with excellent retention of shape can be obtained by sticking a resin material on a fabric substrate. Namely, in producing a preform by laying up reinforcing woven fabrics and providing a shape, the resin material is melt by heating, the molten resin material is penetrated in both facing reinforcing woven fabrics and then cooled/solidified, thereby bonding the interlayer of the reinforcing woven fabrics, as a result, it is possible to obtain a preform excellent in retention of shape.

The above-described resin material may be stuck on both surfaces of a reinforcing woven fabric. However, in bonding the interlayer of the reinforcing woven fabrics, an interlayer adhesion effect is obtained when there is a resin material on at least one side of facing reinforcing woven fabrics. Hence, when a resin material is stuck on at least one surface of a reinforcing woven fabric contacting at each interlayer by contriving the order of laying up, a sufficient shape-retaining effect by adhesion of interlayer can be obtained.

Further, it is sufficient for a resin material to be stuck at least on a surface of a reinforcing woven fabric, but for example, a resin material may be present not only on a surface alone but also inside of a reinforcing woven fabric in the case where a fabric is constituted by a reinforcing fiber bundle containing a resin material.

As the resin material, it is not particularly limited as long as it can be stuck on a surface of a fabric substrate containing reinforcing fiber bundles and the interlayer is bonded by pressurizing and heating the reinforcing woven fabrics laid up, and an effect of retaining the shape of the deformed reinforcing woven fabric can be exhibited. It can be suitably chosen and used from a thermoplastic resin, thermoplastic resin or a mixture thereof. Such resin material is a crystal state or glass state at room temperature, but it is necessary to have a property to melt or soften by heat.

Regarding a resin material, for example, after a resin with a shape such as fiber-form and powdered state is spread on a surface of a fabric substrate, it is softened by heat for bonding the resin to a single yarn constituting a reinforcing fiber bundle, then by a method of cooling and solidifying, or after a liquid resin is sprayed on a surface of a fabric substrate, it is solidified to be stuck on a surface of a fabric substrate. It may be stuck by a method other than that as a matter of course.

In the case where a reinforcing woven fabric is deformed into a three-dimensional shape, since the reinforcing woven fabric is constituted by a reinforcing fiber bundle having a small elongation, the deformation derived from the elongation of the reinforcing fiber bundle is very small. Therefore, it is necessary to vary a relative position between reinforcing fiber bundles constituting a reinforcing woven fabric, namely to be deformed into a three-dimensional shape by varying an angle that yarns constituting a fabric cross.

Further, in the case where a reinforcing woven fabric is deformed into a three-dimensional shape, when each part of a reinforcing woven fabric can flexibly be deformed even under a small deformation load, the whole of a reinforcing woven fabric can be deformed largely and smoothly by the accumulation of very small deformation of each part; as a result, it can follow a complicated three-dimensional shape without wrinkle. In the case where a reinforcing woven fabric with a low deformability under a small deformation load is forcedly deformed into a three-dimensional shape, each part thereof cannot be deformed till a deformation load reaches a given value, but when the load exceeds the given value, a part of a low resistance to deformation generates a local deformation. Therefore, as a whole, it cannot follow a three-dimensional shape, generates a large wrinkle, posing problems in designing property, impregnation of resin and all mechanical characteristics.

Hence, to allow a reinforcing woven fabric to follow a three-dimensional shape without wrinkle, it is important that each part of a reinforcing woven fabric is deformed smoothly even under a small deformation load.

In a fabric substrate on that no resin material sticks, generally, since the relative position of reinforcing fiber bundles constituting a fabric is constrained mainly by friction generated between reinforcing fiber bundles, the relative position of reinforcing fiber bundles can be varied relatively easily, and deformability of reinforcing woven fabric is good.

On the other hand, in a reinforcing woven fabric on that surface a resin material 13 sticks as shown in FIG. 1 and FIG.

2, generally, there are resin materials 11 and 12 stuck over a plurality of reinforcing fiber bundles 14, 15, these resin materials bind the reinforcing fiber bundles together, thus, a strong force of constraint acts between the reinforcing fiber bundles to worsen the deformability of reinforcing woven fabric. As a result, in the case of allowing a reinforcing woven fabric to follow a three-dimensional shape, a necessary deformation tends to hardly occur, and there is a tendency to generate defects such as generation of wrinkle in deformation into a three-dimensional shape.

However, although the reinforcing woven fabric is a reinforcing woven fabric where a resin material is stuck on a surface of at least one side of a fabric substrate containing a plurality of reinforcing fiber bundles, it can be followed into a three-dimensional shape with preventing the generation of wrinkle while exhibiting an interlayer adhesion effect by a resin material since the maximum value of load till an tensile strain in a non fiber axial tensile test reaches 1% is in a range of 0.1 to 0.75N.

Herein, the non fiber axial tensile test is to measure displacement and load in a direction of the maximum deformation of reinforcing woven fabric when an tensile load is applied to an in-plane direction of a reinforcing woven fabric, specifically, it is according the following method.

First, a rectangular test piece (size of measuring part: length 150 mm×width 45 mm) is prepared so that a most deformable direction of a reinforcing woven fabric is a longitudinal direction. This test piece is stretched in a longitudinal direction to measure the amount of deformation (amount of change in a measuring length) and a tensile load at the time.

Figure 3:
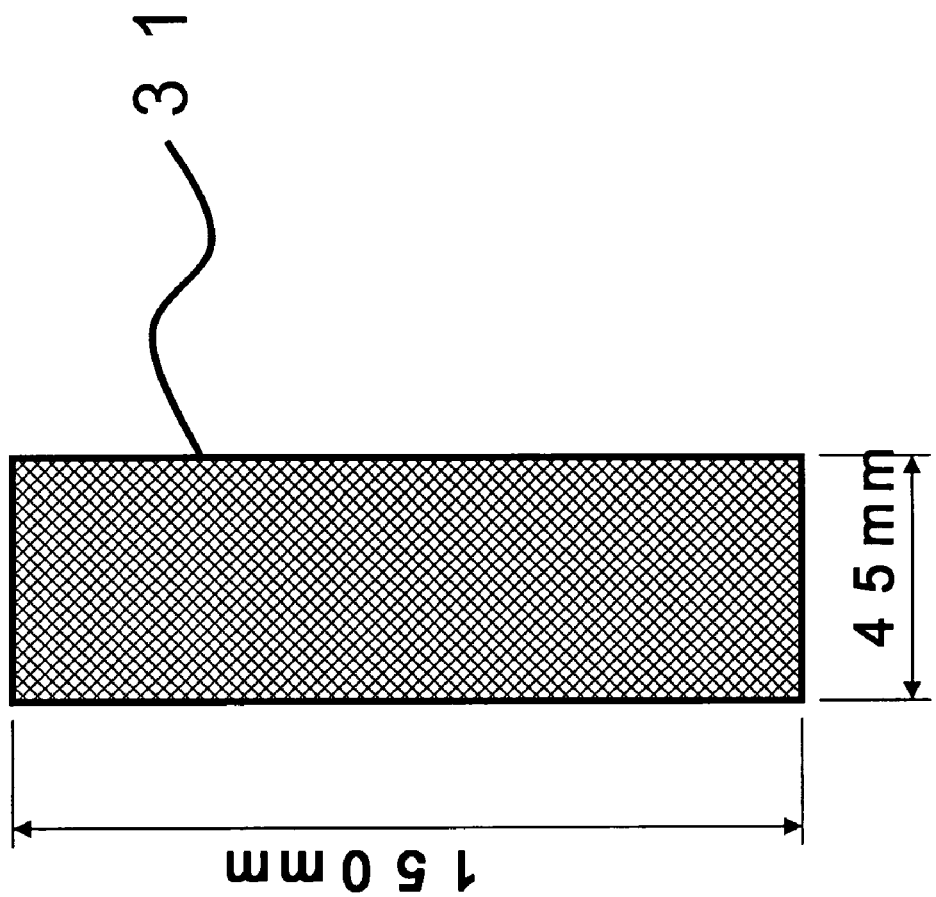
FIG. 3 is a plan pattern view showing a test piece shape of a non fiber axis tensile test.

For example, in the case of a bidirectional reinforcing woven fabric having fiber axes of fiber reinforcing bundles in two directions of 0° and 90°, a most deformable direction when an tensile load is applied is either +45° or −45° directions, thus, a test piece is cut out for either direction to be a longitudinal direction (see FIG. 3).

When a non fiber axial tensile test is carried out using this test piece, a tensile load is applied in a direction different from the fiber axis direction of reinforcing fiber bundles, being accompanied with which, the relative position of reinforcing fiber bundles constituting a reinforcing woven fabric is displaced to change an angle that yarns constituting a fabric cross. As a result, the test piece is deformed so that a distance of a measuring part length becomes large (see FIG. 4). Namely, in a non fiber axial tensile test, deformation generated by changing an angle that yarns constituting a fabric cross is stemmed from the same mechanism of deformation required when a reinforcing woven fabric is followed to a three-dimensional shape, and deformability of reinforcing woven fabric can be known by measuring the relationship between the load and amount of deformation in a non fiber axial tensile test. For example, a reinforcing woven fabric with a small load required for giving a certain amount of deformation is superior in deformability, and it can be said to be a reinforcing woven fabric which easily follows a three-dimensional shape.

Figure 4:
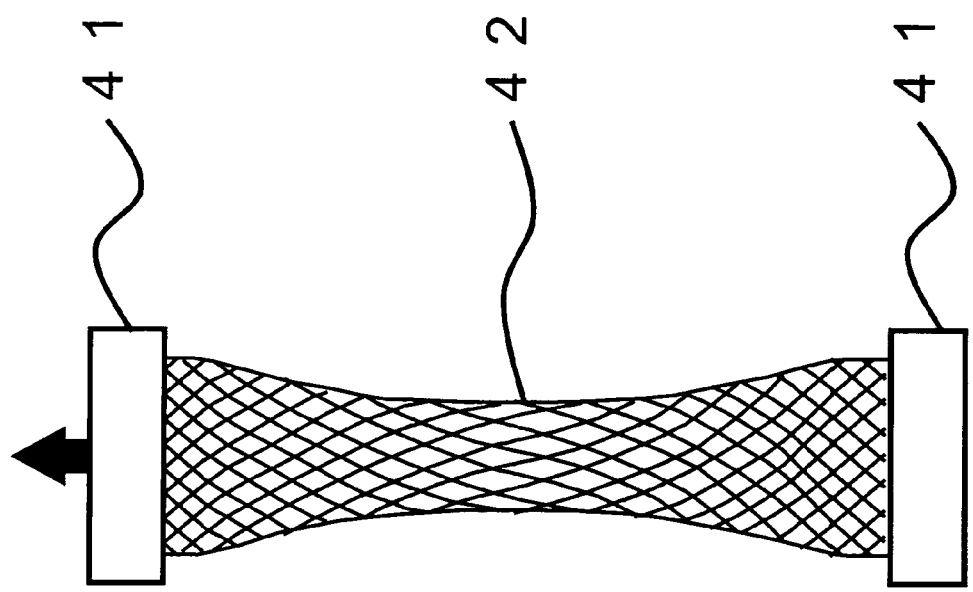
FIG. 4 is a plan pattern view showing a deformed reinforcing woven fabric by a non fiber axis tensile test.

Here, in a non fiber axial tensile test, as shown in FIG. 4, since a test piece shows a nonuniform deformation, it is necessary to pay attention to a measuring result varying depending on test piece size. Therefore, a test is to be conducted by using a test piece of the above-described size.

Further, when a tensile load is applied, in the case where a test piece was deformed in a width direction in a test piece attaching part 41 shown in FIG. 4, a test result varies in the same manner. Thus, it is important to use an attaching tool of a structure in which a uniform clamp pressure can be applied across the whole width of a test piece in attaching a test piece and to attach a test piece not to be deformed in a width direction in a clamp part.

A tensile strain of 1% in this non fiber axial tensile test means a state in which when a test piece was subjected to a tensile deformation in a longitudinal direction, the measuring part length became large by 1.5 mm from an initial length to 151.5 mm.

When the maximum value of load till a tensile strain in a non fiber axial tensile test reaches 1% is in a range of 0.01 to 0.75 N, it is possible to follow a three-dimensional shape smoothly because each part in the reinforcing woven fabric can smoothly deformed under a small deformation load even in a very small deformation region at the beginning of deformation, and there is a low possibility to generate defects such as wrinkle. The upper limit of the maximum value of the load is preferably 0.6 N, further preferably 0.45 N. On the other hand, the lower limit of the maximum value of the load is preferably 0.05, further preferably 0.1. When the maximum value of load required till a tensile strain reaches 1% is in a range of 0.05 to 0.6 N, it is further excellent in deformability, when in a range of 0.1 to 0.45 N leads to a very excellent deformability, and it becomes further easy to be deformed into a three-dimensional shape without wrinkle.

Further, it is preferable for a reinforcing woven fabric that the maximum value of load till a tensile strain in a non fiber axial tensile test reaches 5% is in a range of 0.1 to 1.0 N. A tensile strain of 5% in a non fiber axial tensile test means a state in which when a test piece was subjected to a tensile deformation in a longitudinal direction, the measuring part length became large by 7.5 mm from an initial length to 157.5 mm.

In the case of deforming a reinforcing woven fabric into a three-dimensional shape, it is necessary that a part where a shape changes largely is deformed further largely in addition to accompanying a very small deformation across almost all of parts deformed into a three-dimensional shape.

When the maximum value of load till a tensile strain in a non fiber axial tensile test reaches 5% is in a range of 0.1 to 1.0 N, in the case where a reinforcing woven fabric needs a large deformation in addition to a very small deformation under a small deformation load, a relative position between reinforcing fiber bundles changes easily and, there is a low probability to generate defects such as wrinkle. The upper limit of the maximum value of the load is preferably 0.85 N, further preferably 0.7 N. On the other hand, the lower limit of the maximum value of the load is preferably 0.15, further preferably 0.2. When the maximum value of load till a tensile strain reaches 5% is in a range of 0.15 to 0.85 N, which is further excellent in deformability, when in a range of 0.20 to 0.70 N leads to a very excellent deformability, and it becomes further easy to be deformed into a three-dimensional shape without wrinkle.

Figure 5:
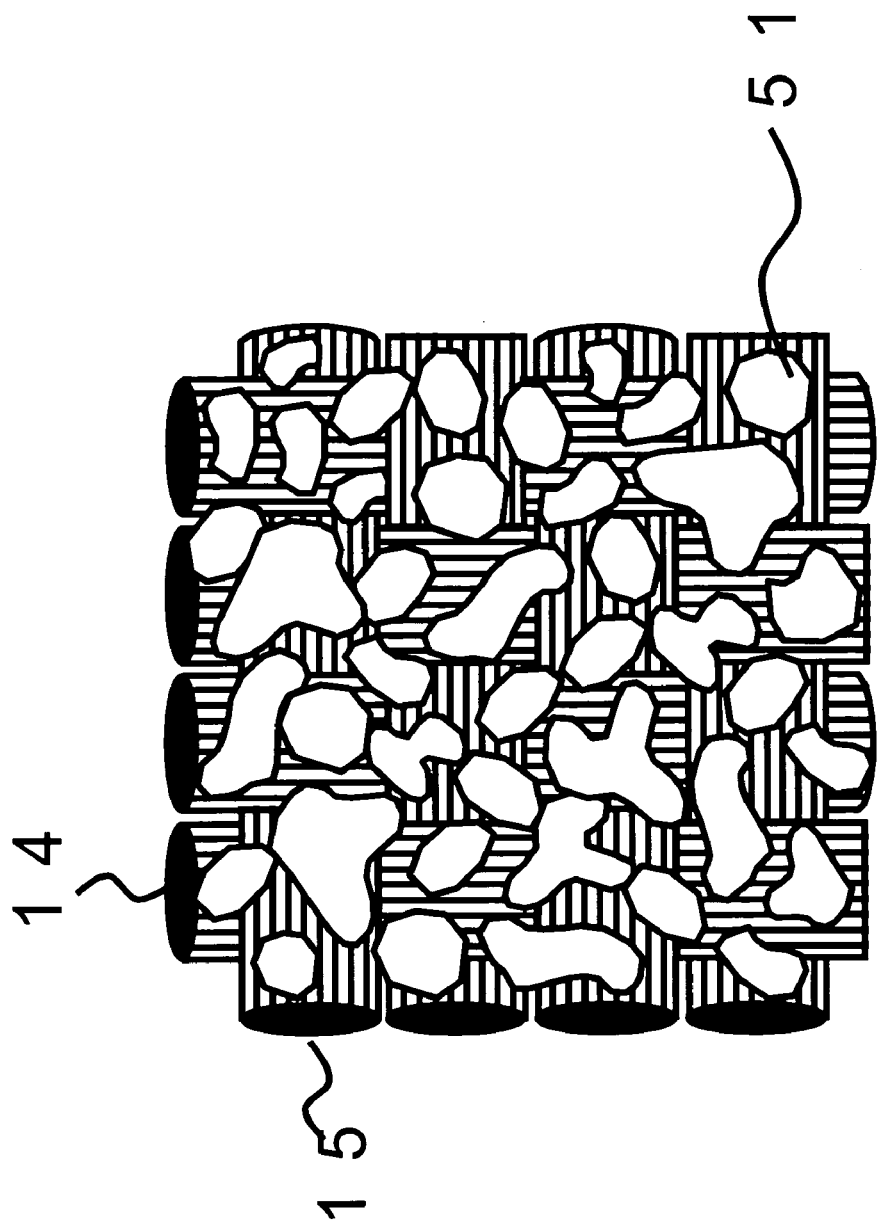
FIG. 5 is a plan pattern view showing a reinforcing woven fabric on that surface a resin material sticks in large amount.

In the reinforcing woven fabric, a resin material is stuck on a surface of at least one side. When the resin material stuck on a surface is much, it is possible to strengthen a function of bonding the interlayer in the case of laying up a plurality of reinforcing woven fabrics stuck with a resin material, and it is possible to obtain a preform excellent in retention of the figure shaped. However, when the resin material is too much, deformability is markedly deteriorated because the resin material bonds the reinforcing fiber bundles constituting a reinforcing woven fabric together too strongly. Further, as shown in FIG. 5, the surface of a reinforcing woven fabric is widely covered by a resin material 51, and when a liquid matrix resin is infused in a reinforcing woven fabric to obtain a fiber reinforced plastic molded component, inflow of the matrix resin into the reinforcing woven fabric is disturbed, which increases a time required for the matrix resin to be homogeneously impregnated thoroughly, or causes a part where no matrix resin is impregnated. From such viewpoints, the stuck amount of resin material is preferably 50 g/m$^2$ or less, more preferably 25 g/cm$^2$ or less, and further preferably 10 g/m$^2$ or less. On the other hand, when the resin material stuck on a surface of a reinforcing woven fabric is not enough, it is not possible to obtain a sufficient adhesive force in bonding the interlayer of the reinforcing woven fabrics and a three-dimensional shape cannot be retained. From such viewpoints, the stuck amount of resin material is preferably 1 g/m$^2$ or more, more preferably 1.5 g/cm$^2$ or more, and further preferably 2 g/m$^2$ or more.

The resin material stuck on a surface is not particularly limited as long as it can be stuck on a surface of a fabric substrate by the foregoing method and can obtain a function of bonding the interlayer of a fabric substrate. A thermosetting resin and/or a thermoplastic resin can be suitably chosen and used, above all, one mainly consisting of a thermoplastic resin is preferable. As the thermoplastic resin, for example, there are polyamide, polysulfone, polyether-imide, polyphenylene ether, polyimide, polyamideimide and the like, but it is not limited thereto. When the resin material is a thermoplastic resin as a major component, the handling property is improved in the case where it is spread and stuck on the surface of a reinforcing woven fabric, further, in the case where the reinforcing woven fabric is laid up, deformed in a three-dimensional shape and then the interlayer is bonded, and productivity is improved. Here, a major component means a component having the largest ratio in components constituting a resin material.

In the reinforcing woven fabric, a resin material is preferably scattered and stuck on the surface of a fabric substrate. Being scattered means a dispersion state over the whole surface region of a fabric substrate. By being scattered, a uniform adhesive force tends to be obtained in the whole surface upon interlayer adhesion even when the amount of resin material is small. Further in this case, it is preferable that 90% or more of the resin material scattered and stuck on the surface of reinforcing woven fabric has a projected area in a direction vertical to the surface of a reinforcing woven fabric in a range of 0.002 to 1 mm$^2$. More preferably, it is 0.002 to 0.2 mm$^2$, and further preferably, it is 0.002 to 0.05 mm$^2$. When the projected area is less than 0.002 mm$^2$, the number of resin material buried in concavity and convexity accompanied with the fabric architecture of a fabric substrate surface is increased to weaken the interlayer adhesion; as a result, it becomes difficult to retain the figure shaped. Reversely, when the projected area is more than 1 mm$^2$, there is a tendency to cause variation in a dispersion state of resin material, it becomes difficult to obtain a uniform adhesion when the interlayer is bonded. Further, there sometimes happens the case that defects tend to generate in the infusion of a matrix resin described above.

As the fabric substrate constituting the reinforcing woven fabric, it is possible to suitably choose from ones constituted by a plurality of reinforcing fiber bundles. For example, there can be used a unidirectional fabric where a plurality of reinforcing fiber bundles aligned in one direction to be parallel each other and an auxiliary fiber (single yarn or fiber bundle) with a small diameter being perpendicular to them are tangled each other to build a fabric architecture, or a bidirectional fabric where a plurality of reinforcing fiber bundles are woven in two directions (for example, perpendicular directions), further, a multi-axial woven fabric where a plurality of reinforcing fiber bundles aligned each in parallel are laid up in multistage for respective fiber directions to be different, which are connected by stitching etc. Among these, a bidirectional fabric is preferred. As the fabric structure of the bidirectional fabric, a plain fabric, twill fabric, satin fabric or the like is mentioned. A bidirectional fabric has merits that deformation of a fabric substrate is easily done by changing a relative position between reinforcing fiber bundles to be deformed into a three-dimensional shape easily and that the layered constitution having a quasi-isotropic mechanical property is easily obtained with a small number of fabrics, which is preferable.

As the reinforcing fiber bundle constituting a fabric substrate, there can be used a carbon fiber bundle, graphite fiber bundle, glass fiber bundle, aramid fiber bundle or the like. Among these, a carbon fiber bundle is preferred. As a carbon fiber constituting a carbon fiber bundle, there are many kinds such as polyacrylonitrile based, rayon based and pitch based ones, and a polyacrylonitrile based carbon fiber is preferably used from the balance of strength and elastic modulus. By using a carbon fiber bundle, it is possible to heighten the mechanical characteristics of a fiber reinforced plastic molded component as a final product. From the viewpoints, the tensile elastic modulus of the carbon fiber bundle is preferably 110 to 600 GPa, and if 210 to 600 GPa, it is preferable because further excellent mechanical characteristics can be exhibited. Herein, the tensile elastic modulus means a value measured in accordance with JIS R7601 (1986) and unit is GPa.

The reinforcing woven fabric as described above can be produced as follows; a resin material is provided and stuck on a surface of at least one side of a fabric substrate containing a plurality of reinforcing fiber bundles, and then the relative position of a plurality of reinforcing fiber bundles constituting the fabric substrate is varied.

Figure 6:
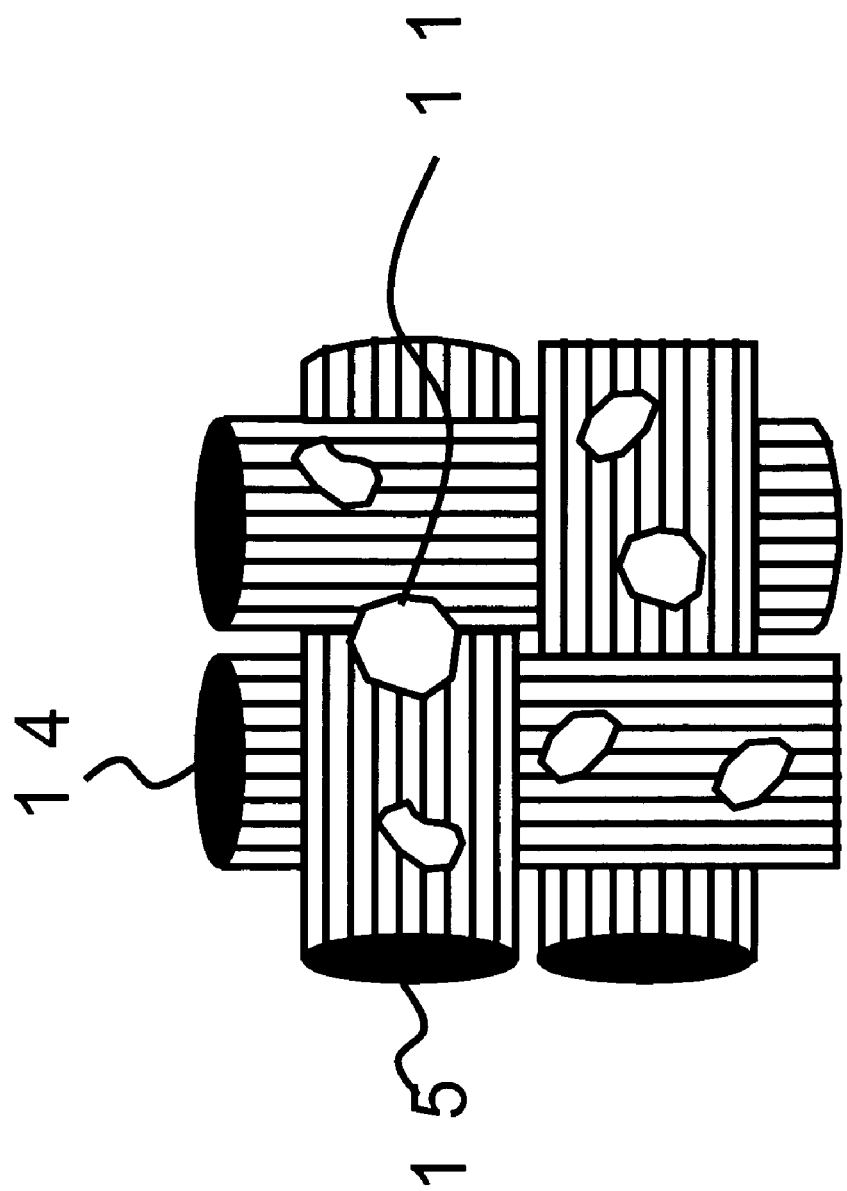
FIG. 6 is a plan pattern view showing a reinforcing woven fabric on that surface a resin material sticks.
Figure 7:
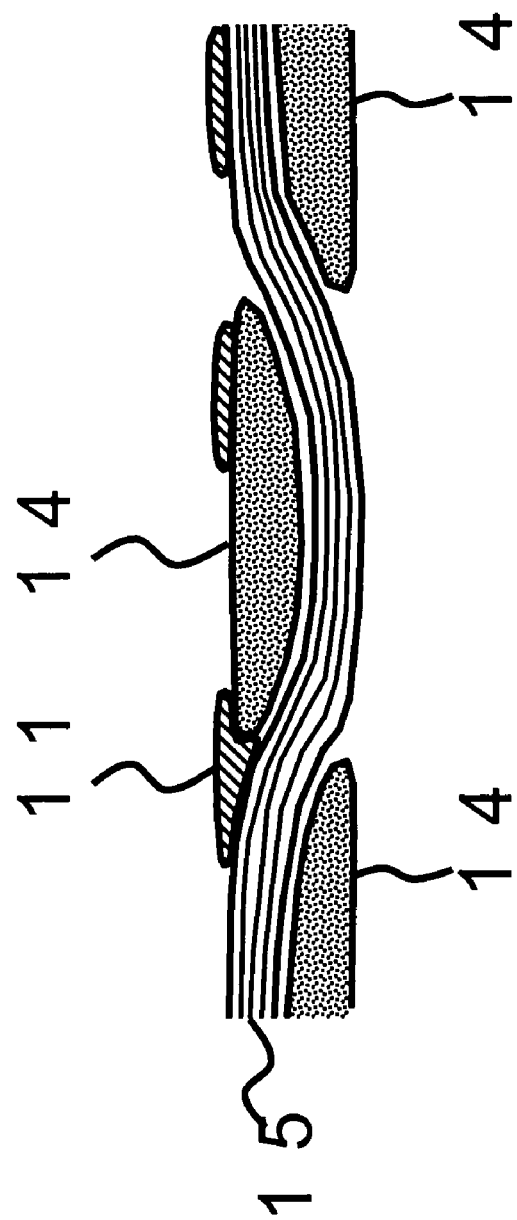
FIG. 7 is a sectional pattern view showing a reinforcing woven fabric on that surface a resin material sticks.
Figure 8:
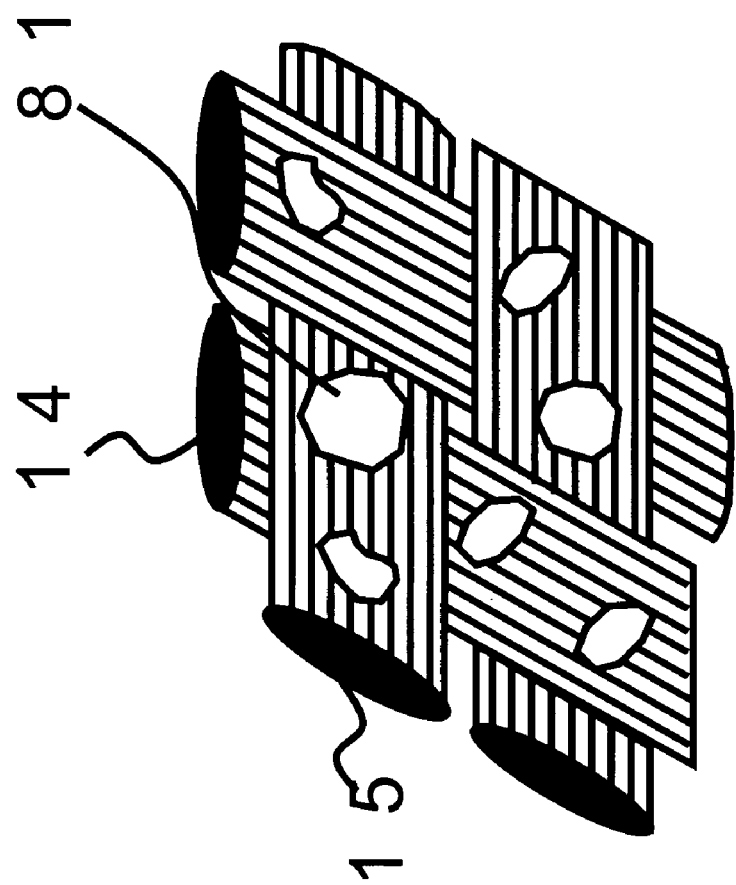
FIG. 8 is a plan pattern view showing a reinforcing woven fabric that a resin material sticks only on a part of reinforcing fiber bundle.
Figure 9:
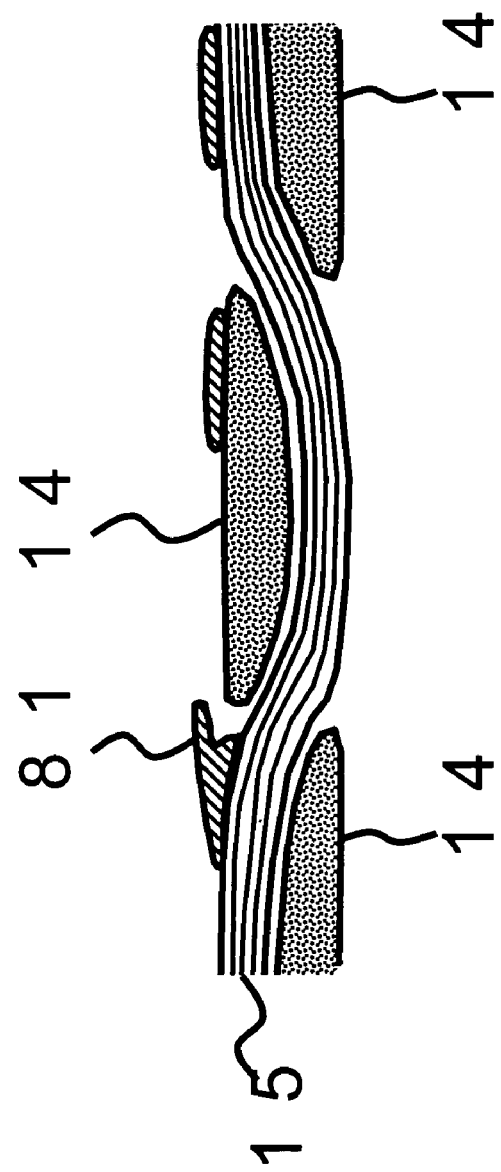
FIG. 9 is a sectional pattern view showing a reinforcing woven fabric that a resin material sticks only on a part of reinforcing fiber bundle.

The resin material can be stuck on the surface of a fabric substrate by the foregoing method. As shown in FIG. 6 and FIG. 7, even in the case where there is a resin material stuck over a plurality of reinforcing fiber bundles, by giving a larger external force than a force of constraining a positional variation between reinforcing fiber bundles generated by a stuck resin material, the relative position between reinforcing fiber bundles constituting a fabric substrate is forcedly varied, as shown in FIG. 8 and FIG. 9, it is possible to produce a condition in which a resin material is stuck only on a part of reinforcing fiber bundles.

The resin particle stuck over two reinforcing fiber bundles is generally stuck more strongly on either of the reinforcing fiber bundles. Thus, the resin material moves together with a reinforcing fiber bundle stuck more strongly when the relative position between the two reinforcing fiber bundles stuck with the resin material is varied; as a result, it is peeled from the other reinforcing fiber bundle.

In this manner, by varying the relative position between the reinforcing fiber bundles forcedly by an external force, the resin material stuck on two or more reinforcing fiber bundles is peeled from a part of the reinforcing fiber bundles, resulting in a state in which it is stuck only on a reinforcing fiber bundle stuck more strongly.

As a result, there is no function of constraining the deformation of resin material even in a reinforcing woven fabric on that surface a resin material sticks, and then it comes to have a property that the maximum value of load till an tensile strain in a non fiber axial tensile test reaches 1% is in a range of 0.01 to 0.75 N, so that the same level of excellent deformability as the fabric substrate that sticks no resin material.

Here, as a whole reinforcing woven fabric, it may not be excluded to remain a resin material stuck partially over a plurality of reinforcing fiber bundles as it is not being peeled from the reinforcing fiber bundles.

Further, to peel adhesion of resin material from reinforcing fiber bundles by varying a relative position between a plurality of reinforcing fiber bundles constituting a fabric substrate, a resin material must be substantially in a solid state. Namely, the relative position of reinforcing fiber bundles is varied after sufficiently cooling in the case where a resin material is stuck by a thermal adhesion, and after sufficiently drying in the case where it is sprayed as a solution. In this way, the resin material stuck can efficiently be peeled.

In the case where the relative position between reinforcing fiber bundles is once varied, even though the positional relation is returned to the original, the peeled resin material does not stick again as long as the resin material is not softened by reheating etc., so that if the reinforcing woven fabric is returned to the original shape after being varied, no weave pattern is disrupted and it is possible to obtain a reinforcing woven fabric retaining the same fabric structure as that before being varied.

The method for varying a relative position between reinforcing fiber bundles may be any method so long as to obtain a function of varying a relative position between reinforcing fiber bundles by overwhelming a force of constraint generated through adhesion between reinforcing fiber bundles by a resin material. For example, a relative position between reinforcing fiber bundles may efficiently be varied by giving a shearing deformation in an in-plane direction of a fabric substrate on that surface a resin material sticks.

To give a shearing deformation to a fabric substrate, for example, there may be used an apparatus having a wind-off mechanism for a fabric substrate on that a resin material stuck, a swing mechanism giving deformation in a width direction by swinging a fabric substrate in the width direction while holding it and a wind mechanism of a fabric substrate.

The wind-off mechanism is constituted by an axis for placing a roll of a fabric substrate on that a resin material stuck, and a mechanism for giving a suitable tension to a fabric substrate to be wound off from the roll. The mechanism for giving a tension may use any mechanism as long as it can give a tension to a fabric substrate to be delivered, for example, a mechanism for giving a tension through connection to an apparatus such as powder brake giving a torque to an axis that a roll is placed with, a mechanism for giving a tension through nip of fabric substrate to be delivered by a pair of rolls whose rotation is controlled, or a mechanism for giving a tension by a frictional force between a roll whose rotation is controlled and a fabric substrate.

Figure 16:
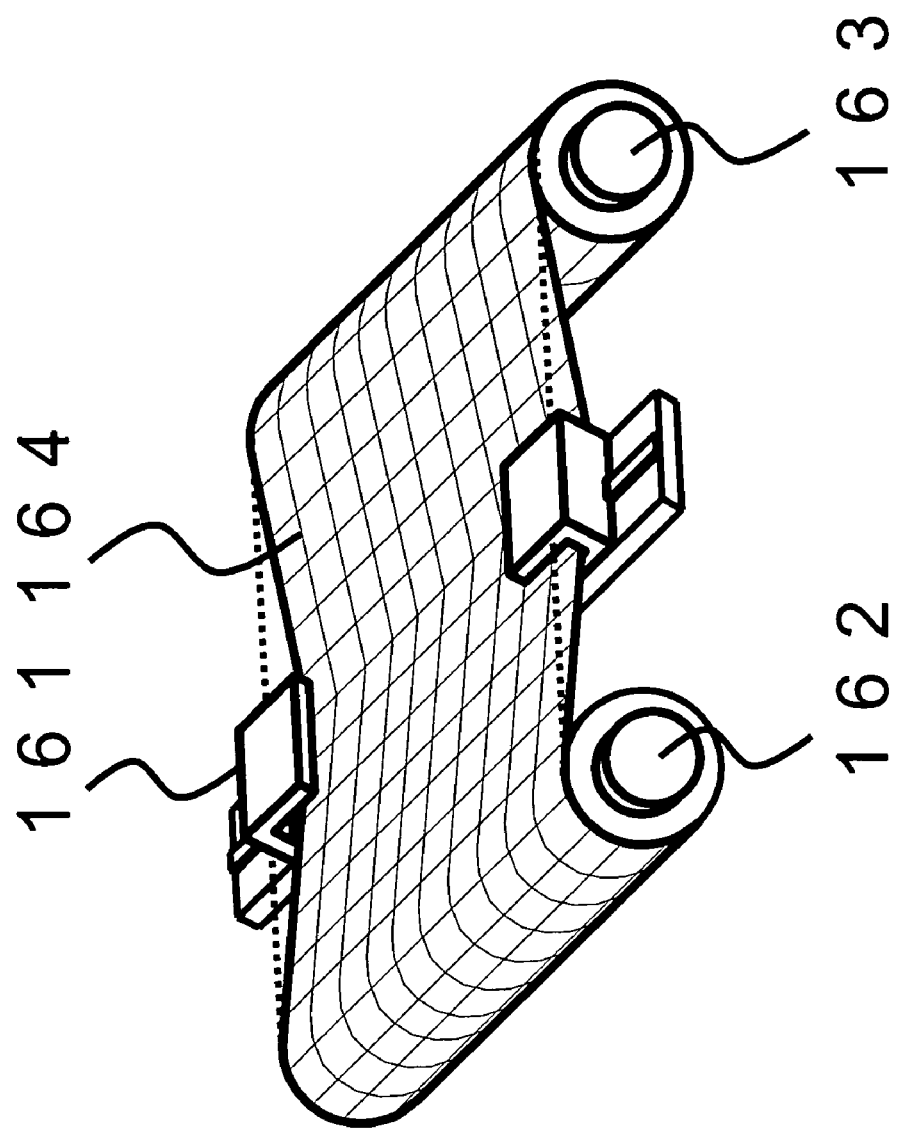
FIG. 16 is a schematic perspective view showing one embodiment of a mechanism for swinging a fabric substrate in a width direction.
Figure 17:
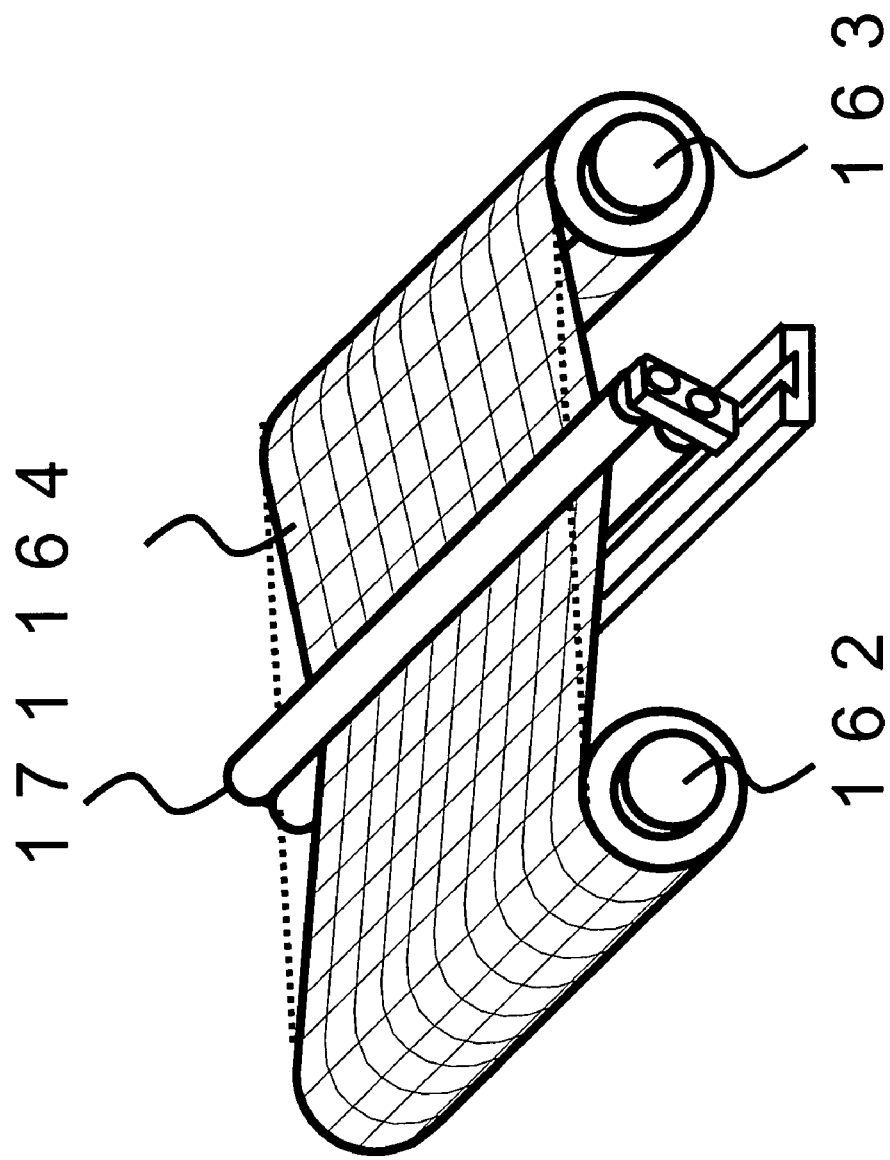
FIG. 17 is a schematic perspective view showing another embodiment of a mechanism for swinging a fabric substrate in the width direction.
Figure 18:
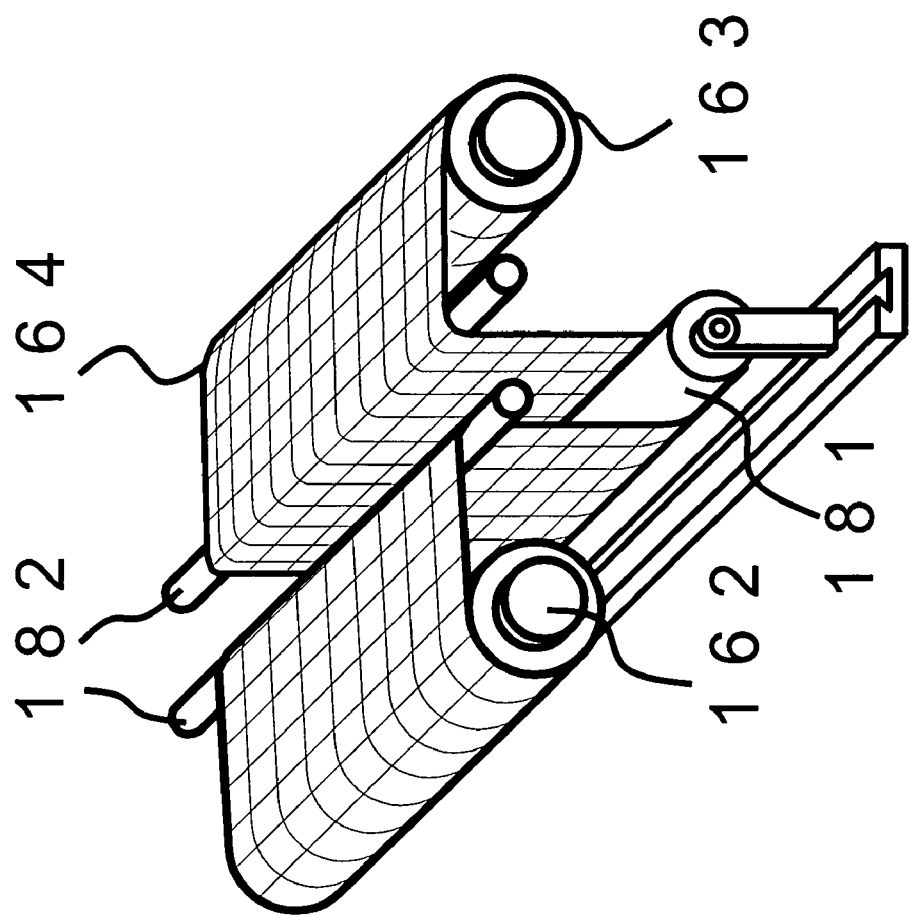
FIG. 18 is a schematic perspective view showing another embodiment of a mechanism for swinging a fabric substrate in the width direction.

The swing mechanism for swinging a fabric substrate in the width direction may use any constitution as long as it can swing a fabric substrate in the width direction. For example, there can be exemplified an edge-holding swing mechanism 161 holding an edge of a fabric substrate in the width direction and giving a tension in the width direction shown in FIG. 16, or a nip swing mechanism 171 nipping a fabric substrate from up and down with a tool and swinging the tool in the width direction of a fabric substrate as shown in FIG. 17. As shown in FIG. 18, there is also preferably used a mechanism of swinging while holding a fabric substrate with frictional force by swinging a swing roll 181 in which the width direction of a fabric substrate is the rotational axis direction to its rotational axis direction.

In the case of using the mechanism shown in FIG. 18, it is preferable to arrange the swing roll 181 for which a fabric substrate pass with a large wrapping angle, since a large frictional force is obtained against a reinforcing woven fabric, and the fabric substrate can efficiently be swung. Herein, the wrapping angle is referred to an angle in which a fabric substrate wraps to a circumference of the swing roll when passing through the swing roll 181 from a delivery roll 182 to move to a next delivery roll 182.

Further, by increasing a friction coefficient of a roll surface using a rubber material for the roll surface for example, it is possible for a fabric substrate not to slip on a roll surface in swinging a fabric substrate in the width direction. By doing this, as well as a fabric substrate can further efficiently be swung, it is possible to prevent a surface of a fabric substrate from damage of abrasion by slip on a roll surface. Similarly, not to give any damage to a fabric substrate, a driven rotation of a swing roll in accompanying with the run of a fabric substrate is preferable.

Figure 19:
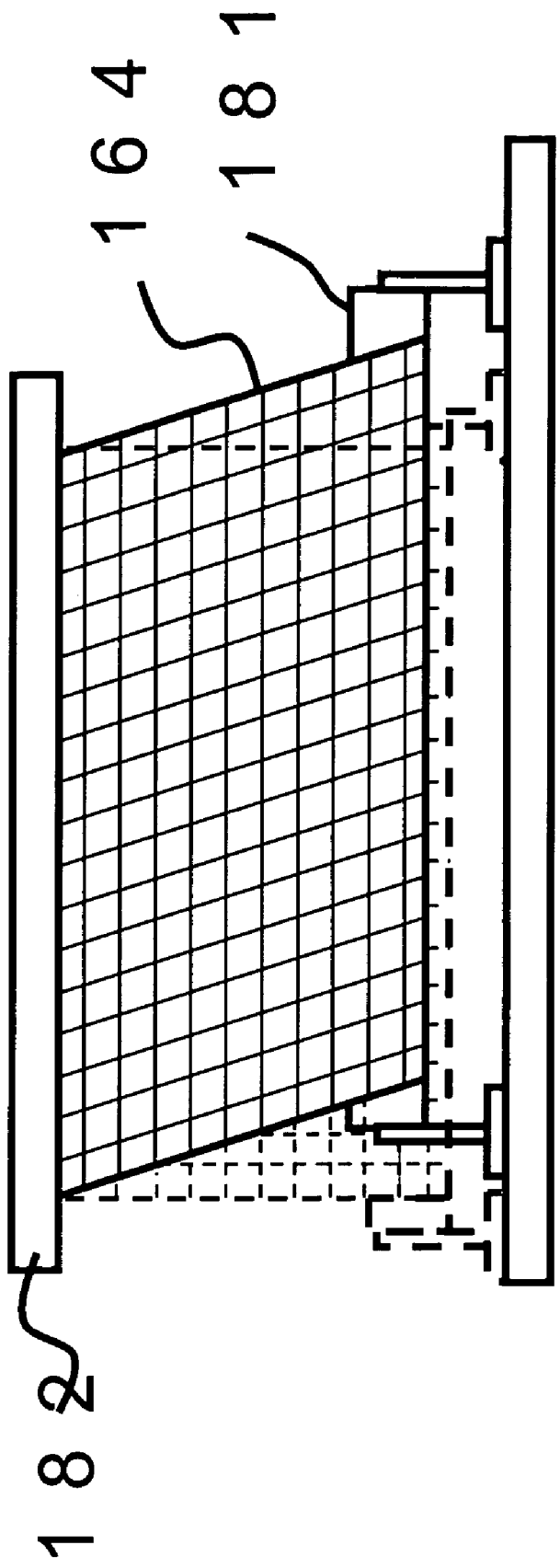
FIG. 19 is a schematic perspective view showing another embodiment of a mechanism for swinging a fabric substrate in the width direction.

The length of delivery path changes when a fabric substrate is swung in the width direction. Therefore, as shown in FIG. 19, when the swing roll 181 swings in the axial direction, it is preferable to have a mechanism capable of moving in a direction perpendicular to the rotational axis as well in order to absorb the change of path length.

The wind mechanism may be a constitution in which a fabric substrate is wound on a roll by rotation of an axis that the roll is disposed. Winding may be a continuous operation at a constant speed, or may be an intermittent operation repeating winding and stopping in such manner that, for example, it stops in operation of a swing mechanism and winding is done in stop time of a swing mechanism.

Figure 10:
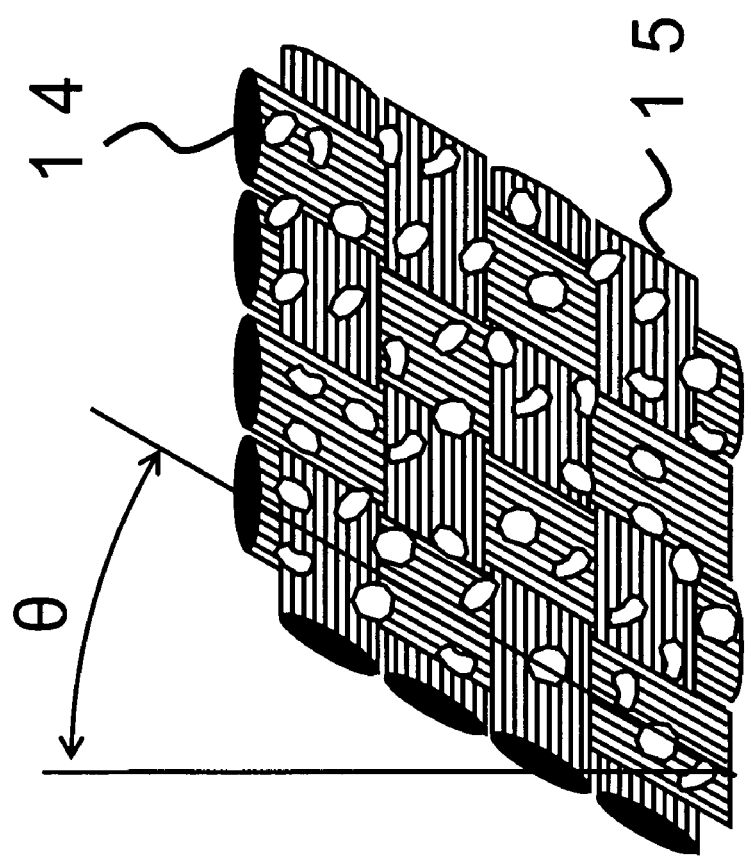
FIG. 10 is a plan pattern view showing a reinforcing woven fabric provided with shearing deformation.

For example, when a shearing deformation is given to a bidirectional fabric substrate shown in FIG. 1 by the foregoing method, the fabric substrate is deformed as shown in FIG. 10. When a shearing deformation is given to a rectangular part in which intersections of reinforcing fiber bundles are apexes the rectangular part is deformed into a parallelogram while keeping the length of respective sides. At this time, an angle between reinforcing fiber bundles constituting a fabric is deformed, and a relative position between reinforcing fiber bundles is varied. As a result, it is possible to peel the resin material stuck over a plurality of reinforcing fiber bundles partly from the reinforcing fiber bundles.

The angle $\theta$ of shearing deformation shown in FIG. 10 (namely, using a certain reinforcing fiber bundle as a standard, an angle difference between before and after shearing deformation of reinforcing fiber bundles crossing to the standard) is preferably in a range of 5 to 45°. When the shearing deformation angle is less than 5°, it is not possible to obtain an effect of peeling the resin material stuck over a plurality of reinforcing fiber bundles sufficiently because of insufficient variation of a relative position between reinforcing fiber bundles. On the other hand, when the shearing deformation angle is more than 45°, disturbance of fabric texture is left, or defects such as generation of damage in a reinforcing woven fabric occurs easily when the reinforcing woven fabric is deformed and then tried to return to the original shape. That is why it is not preferable. In order to obtain an effect of peeling a resin material more efficiently, the shearing deformation angle is more preferably 100 or more, and further preferably 200 or more. On the other hand, in order to prevent the damage of a reinforcing woven fabric more surely, the shearing deformation angle is more preferably 40° or less, and further preferably 30° or less.

By using the thus obtained reinforcing woven fabric, it is possible to obtain a preform without wrinkle even in a three-dimensional shape.

The preform is formed by laying up the reinforcing woven fabric together with a fabric substrate that does not sticks a resin material according to need, and integration thereof. In the preform, a plurality of fabric substrates are integrated by a resin material and also it contains at least one layer of the reinforcing woven fabric stuck with the resin material.

Resulting from bonding a plurality of fabric substrates deformed in a three-dimensional shape with each other via a resin material in the interlayer, the preform retains its three-dimensional shape. In a surface where the fabric substrates laid up contact each other, when a resin material is stuck on the surface of at least one side of a fabric substrate, an adhesion action in the interlayer can be obtained. Hence, considering the shape of the reinforcing woven fabric in actual use, a part of the whole necessary fabric substrates constituting a preform may be replaced by the reinforcing woven fabric. Namely, when a resin material is stuck on both surfaces of a fabric substrate constituting the reinforcing woven fabric, the reinforcing woven fabric and other fabric substrate may alternately be disposed. Further, when it is enough for a part of fabric substrates constituting a preform to be stuck, the number of other fabric substrate may be increased.

However, when an adhesion action by a resin material can be obtained in every interlayer, there can be obtained a preform which has no peeled interlayer, an excellent handling property, no wrinkle efficiently and an excellent shape stability as well. Therefore, in the case where a desired preform is a complicated shape, thus, where an adhesion action in every interlayer is required, it is preferable that the reinforcing woven fabric where a resin material is stuck on both surfaces of a fabric substrate and other fabric substrate may alternately be disposed, or the total numbers of necessary fabric substrates constituting a preform, or the numbers except one substrate are set to the reinforcing woven fabrics. A preform which is not peeled as a whole and excellent in handling property can be obtained thereby. Here, the total numbers of necessary fabric substrates constituting a preform may be the reinforcing woven fabrics where a resin material is stuck on both the surfaces as a matter of course.

A preform using the reinforcing woven fabrics can be formed as follows.

First, the reinforcing woven fabrics is laid up in a shaping mold together with other fabric substrate containing reinforcing fiber bundles according to need. Next, the layered product is pressurized and heated while being imposed to follow a shape of the shaping mold, which softens a resin material stuck on the reinforcing woven fabrics to bond the interlayer of the layered product and to retain the shape. In this way a preform is obtained.

Figure 11:
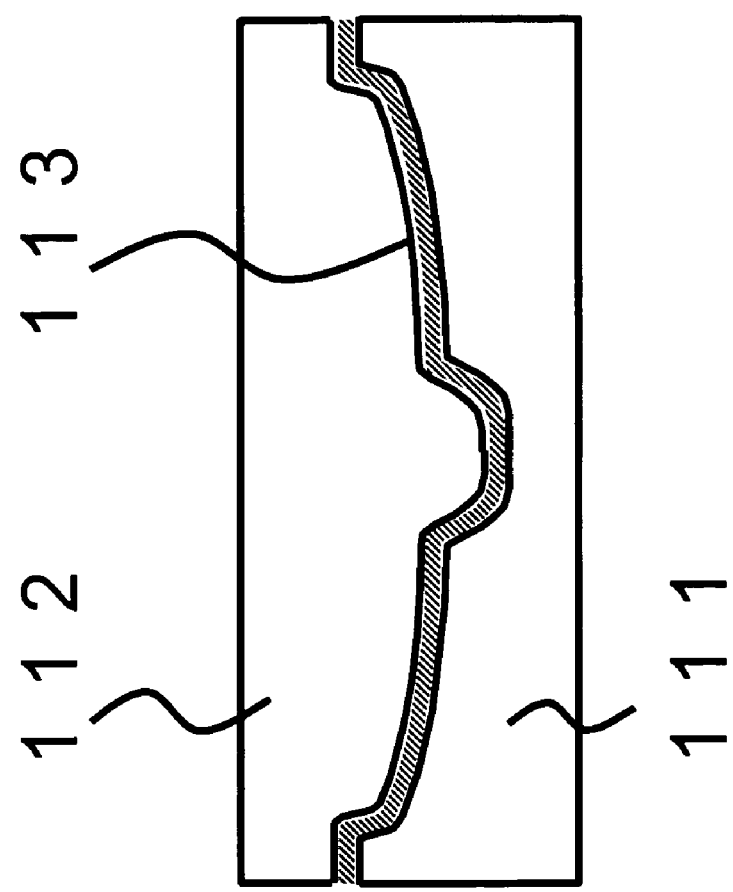
FIG. 11 is a side pattern view showing one embodiment of a method for deforming a layered product into a shape along a shaping mold, pressurizing and heating.
Figure 12:
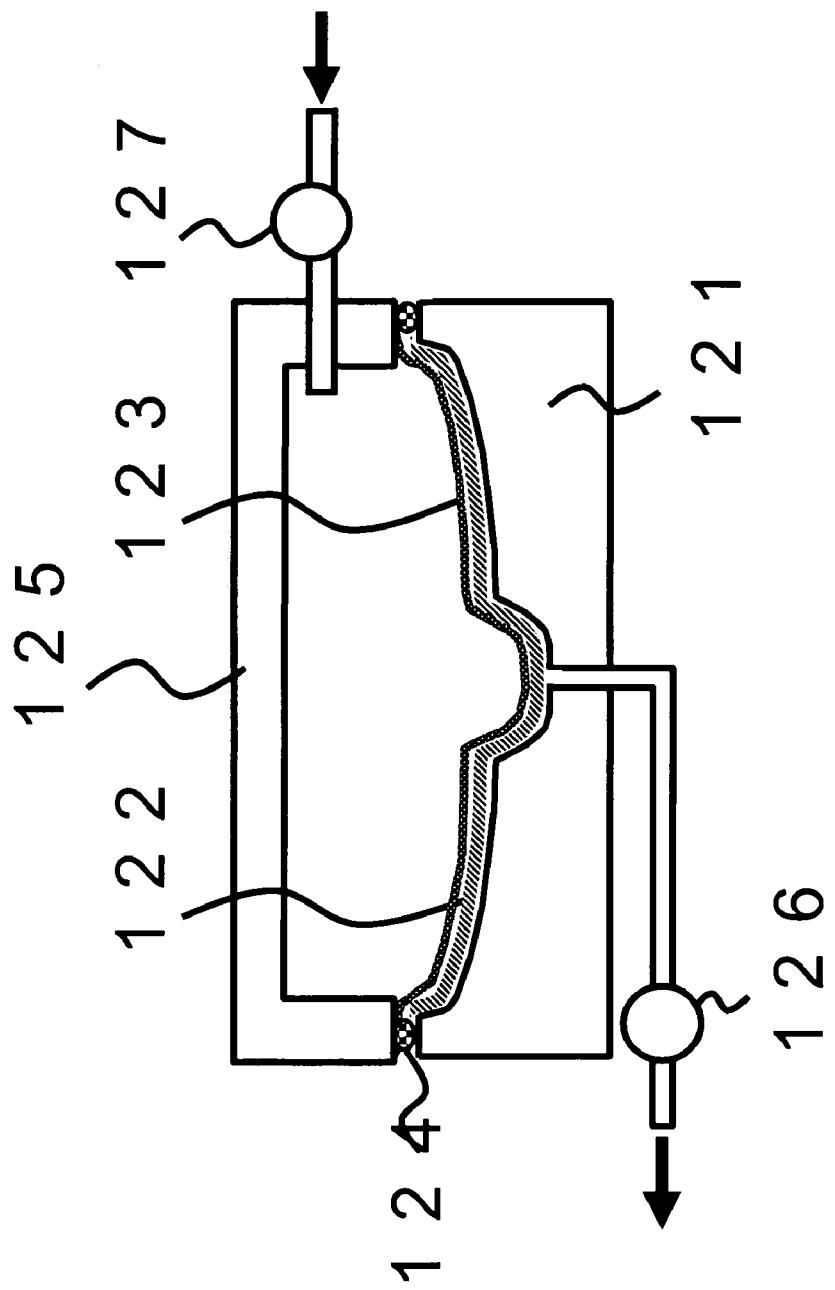
FIG. 12 is a side pattern view showing another embodiment of a method for deforming a layered product into a shape along a shaping mold, pressurizing and heating.

As a method for pressurizing a layered product, for example, there can be exemplified a method in which using a pair of shaping molds capable of shaping almost the same shape as that of a desired fiber reinforced plastic molded component (namely, a mold having almost the same mold shape as the molding tool in which a matrix resin is infused and cured), after the layered product is laid up in one shaping mold, the other shaping mold is closed and tighten up, while pressurizing the layered product, which is deformed into a shape along the shaping mold (see FIG. 11). Further, there can be exemplified a method in which using a shaping mold of one surface having almost the same shape as the molding tool, after the layered product is laid up on the shaping mold, from which the layered product is covered with a sheet, the inside of a space surrounded by the sheet and the shaping mold is vacuumed, or a pressurized gas is introduced into a chamber, thereby the layered product is pressurized via the sheet, and imposed on the shaping mold to be deformed into a shape along the shaping mold (see FIG. 12). Here, it is not limited thereto. Further, a pair of shaping molds described above may be a type in which one of shaping molds constituting it may be divided to be plural pieces.

As a method for heating a layered product, there can be exemplified a method by heat conduction of a heated shaping mold and layered product, a method of heating from outside by an infrared heater etc., or a method of spraying a heated gas or liquid, but it is not particularly limited. The shaping mold can be heated by a method in which a pipe arrangement is provided inside and a heat medium is run in the pipe arrangement, or a heater is provided inside.

To produce a preform efficiently, it is preferable to use a method in which a layered product is tightly contacted with a shaping mold heated at a temperature required for softening a resin material to heat by heat conduction. In this case, when a resin material is softened before deforming a layered product into a shape along a shaping mold, there is a case in which adhesion of the resin material increases and the interlayer of the layered product is hardly slide and deformation into a three-dimensional shape becomes difficult; thus, it is preferable to be pressurized and deformed before heat conducts a resin material.

The temperature of heating a layered product may be a temperature which can exhibit an action to bond the interlayer of a layered product by softening a resin material. By heating a layered product while pressurizing it, the reinforcing woven fabric and fabric substrate constituting a layered product are imposed each other, the resin material which was softened penetrates between single yarns of reinforcing fiber bundles constituting the facing reinforcing woven fabric and fabric substrate. Next, by cooling the layered product, the resin material sticks both the facing reinforcing woven fabric and fabric substrate, and exhibits an action to bond the interlayer of the layered product. As a method for cooling a layered product, there can be exemplified a method of heat conduction of a shaping mold and layered product by cooling a shaping mold, or a method of spraying a cold air to a layered product, but it is not particularly limited.

In such ways, by deforming a layered product into a three-dimensional shape and bonding the interlayer, a preform without wrinkle in spite of being deformed into a three-dimensional shape can be produced. Further, regarding this preform, since the interlayer of a layered product is bonded, it has features that rigidity is high and shape retention is excellent, and also handling of preform in delivery, arrangement in a molding tool to infuse a matrix resin and the like can be efficiently conducted.

Further, a preform can also be produced by disposing a layered product between of facing at least two shaping molds, pressurizing a part of the layered product, and then heating the remaining part as well as pressurizing. In the method, when a layered product is disposed between the shaping molds and a part of the layered product is pressurized, a part not pressurized in the layered product is not in constraint, thus it can move freely, and the amount of the layered product necessary to follow a shape of the shaping mold is gathered from the circumference. Next, when a circumference part is pressurized, the whole of the layered product is pressurized and deformed along the shape of the shaping mold. The layered product is heated in a state along the shape of the shaping mold, and a resin material is softened to become a preform that the interlayer is bonded. By pressurizing the whole after pressurizing a part thereof first, in particularly, even in a concavity and convexity changing its shape largely, the necessary amount of the layered product to follow the shape of the shaping mold is supplied without delay, so that a preform without wrinkle can be efficiently produced with no assist by a hand operation.

The place being pressurized before the whole of a layered product is pressurized is not particularly limited; for example, in the case where a layered product is deformed into a relatively smooth shape, it is preferably around the center of such shape because the layered product is easily pulled in from the circumference. In the case where a layered product is deformed into a shape with bump, it is preferably the concavity of the bump. When the concavity is first pressurized, a necessary and sufficient amount of layered product for a layered product to be deformed into a shape along the concavity is supplied, which can shape it well. Further, for a shape with a plurality of bumps, it is pressurized stepwise in such way that the adjacent concavities are subsequently pressurized and the remaining all is finally pressurized, thereby a preform can be effectively produced while preventing the generation of wrinkle.

Figure 13:
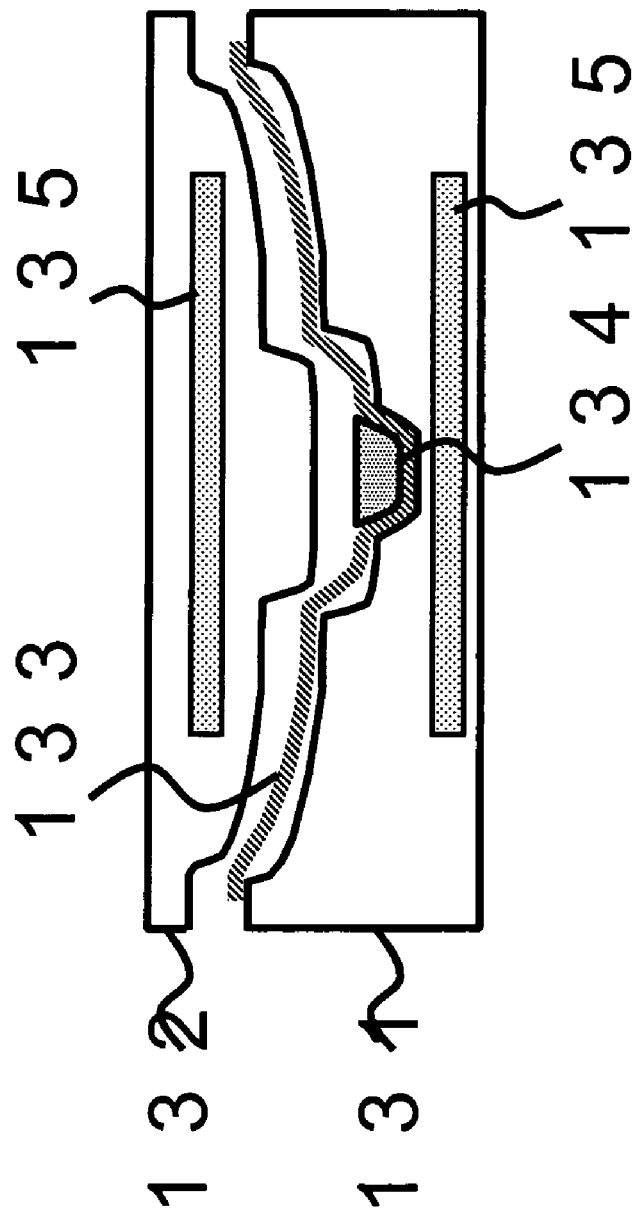
FIG. 13 is a side pattern view showing another embodiment of a method for deforming a layered product into a shape along a shaping mold, pressurizing and heating.

As a method for pressurizing and heating a remaining part after a part of a layered product has been pressurized, as shown in FIG. 13, there can be exemplified a method that to a layered product 133 laid up on a shaping mold 131, a pressurizing action is given by a part mold 134, subsequently, the whole is held by a shaping mold 132 oppositely placed, pressurized and heated. Herein, a part mold means a member for deforming a part of a layered product into a shape along a shaping mold. By pressurizing a layered product using the part mold, the layered product is sandwiched between a shaping mold and the part mold to be deformed into a shape along a shaping mold.

The part mold, in a part for pressurizing a layered product, must have a shape along a shaping mold corresponding to the part, and also in a part not contacting a layered product, must have a shape not to disturb an action that a shaping mold or a sheet holds and pressures a layered product. As the part mold, there can be used one that a material such as metal, resin or rubber is cut or processed into a desired shape. To heat a layered product efficiently, a part mold is preferably heated, but which is not essential because a layered product is heated from a shaping mold as well.

Figure 14:
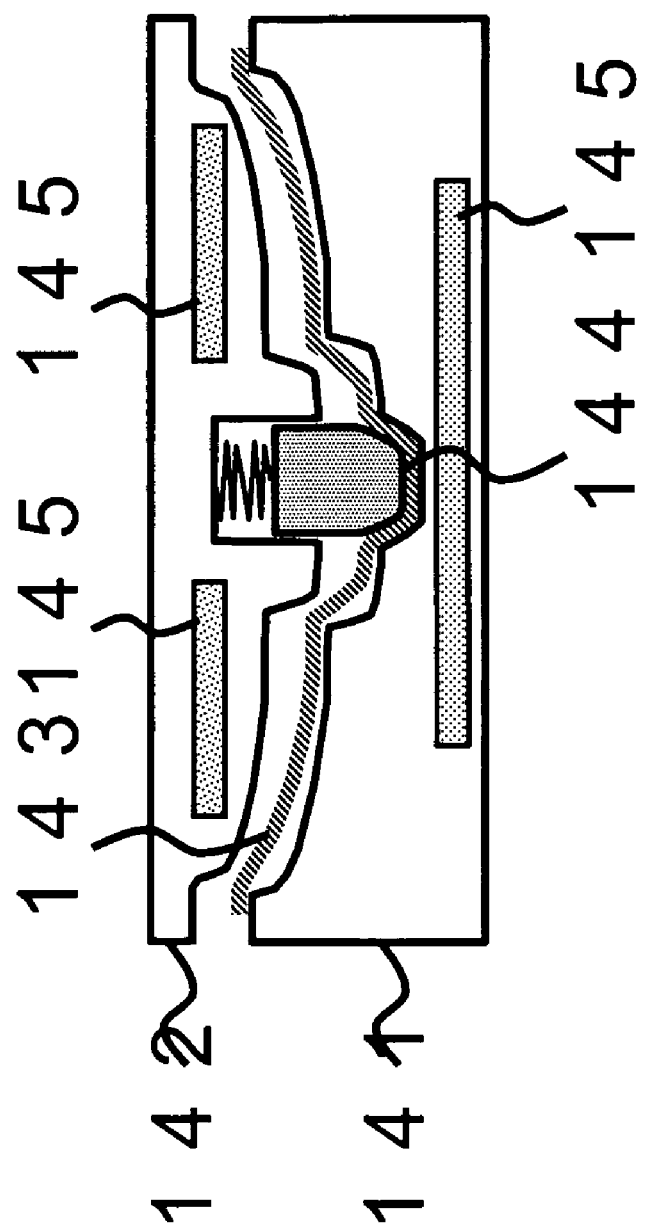
FIG. 14 is a side pattern view showing another embodiment of a method for deforming a layered product into a shape along a shaping mold, pressurizing and heating.

A part mold, as shown in FIG. 14, may be constituted by a movable part 144 capable of projecting being provided in at least one side of facing shaping molds 141 and 142. In this embodiment, first, the shaping molds are made adjacent together in a state projecting the movable part 144, a part of a layered product 143 is pressurized by other shaping mold 141 and the projected movable part. Next, the shaping molds are made more adjacent together and also the projected movable part 144 is pulled to the inside direction of the shaping mold, the whole layered product is pressurized and heated by the whole of the facing shaping molds 141 and 142.

Figure 15:
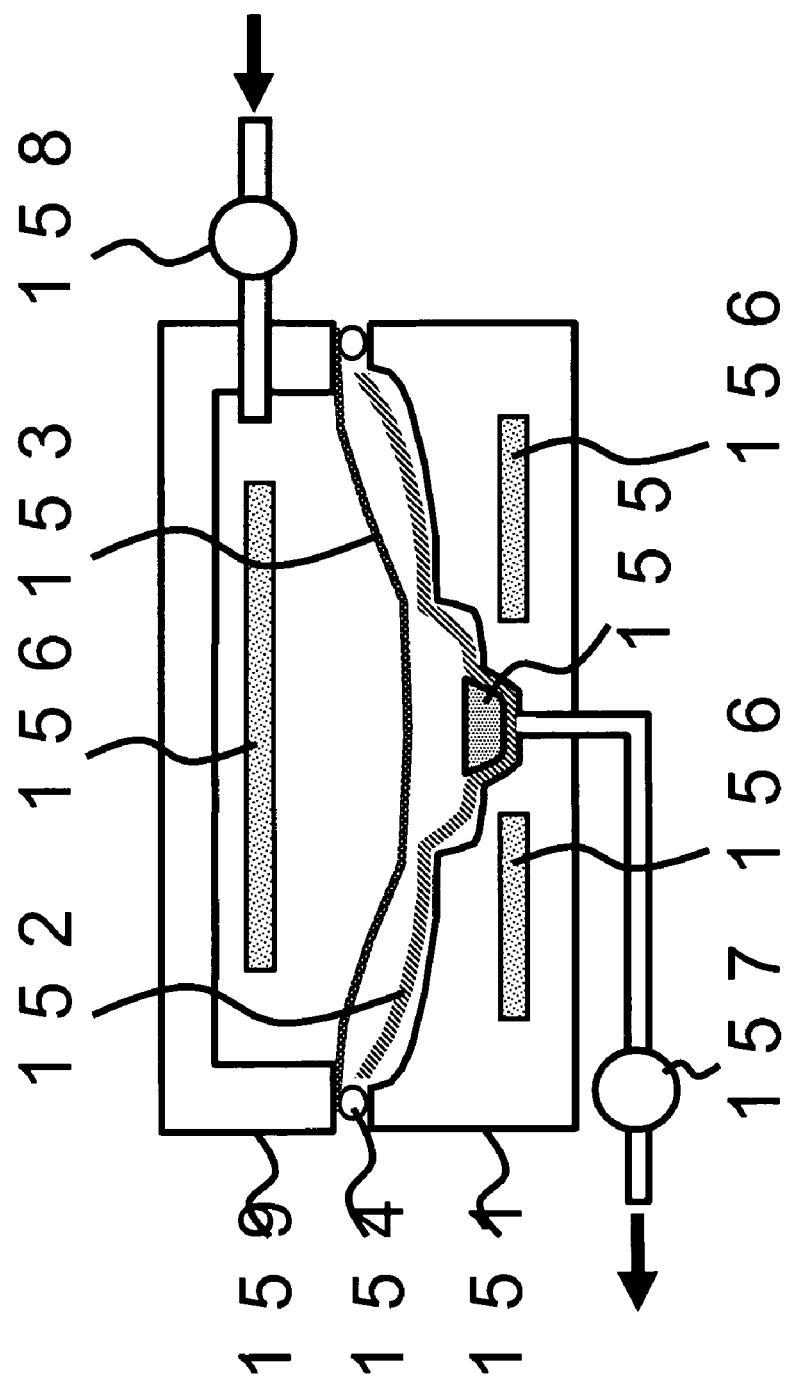
FIG. 15 is a side pattern view showing another embodiment of a method for deforming a layered product into a shape along a shaping mold, pressurizing and heating.

Further, a preform can also be produced in such way that after a part of a layered product laid up in a shaping mold is imposed on the shaping mold, a sheet is covered on the layered product, the layered product is pressurized and heated by gas or liquid. In the method, as shown in FIG. 15 for example, a part of a layered product 152 laid up in a shaping mold 151 is imposed on the shaping mold by a part mold 155, and a part of a layered product is deformed into a shape along the shaping mold. The shape of the part mold is set to be along the corresponding part of the shaping mold. At this time, a part of a layered product not imposed is not in constraint, thus it can move freely, and the amount of the layered product necessary to follow the shaping mold is pulled in from the circumference. Next, the layered product can be pressurized in such manner that a sheet 153 is covered on the layered product, a gap between the circumferential part and the shaping mold is sealed by a sealer 154, and inside of the space surrounded by the shaping mold and the sheet 153 is vacuumed by a vacuum pump 157 or, gas or liquid inside the space surrounded by the sheet 153 and a chamber 159 is pressurized by using a pressurizing device 158. Further, a layered product can be heated by heating a shaping mold by a heater 156 or, by heating gas or liquid. In doing so, a preform can be produced in such manner the whole of a layered product is deformed into a shape along the shaping mold, further a resin material inside the layered product is softened and the interlayer adhesion action is exhibited.

As a material of sheet, there is listed a silicone rubber, natural rubber, nylon resin, polyethylene resin, polypropylene resin or the like, but it is not limited thereto.

A sheet which has a characteristic of stretch is preferable because it follows a shape easily even if a desired shape of preform is complicated. Hence, a degree of elongation of a sheet is preferably 5% or more. Additionally, it is no problem that a degree of elongation of a film is large, in views of repeated use, heating and the like; the upper limit in a degree of elongation of film answering in an actual use is preferably 400%.

Further, it is effective for an efficient deformation of a layered product in which a sheet is previously shaped in almost the same shape as the shape in which a layered product is to be deformed.

The fiber reinforced plastic molded component can be produced by infusing and impregnating a liquid matrix resin into a preform produced by the foregoing method, followed by curing or solidifying the resin.

The above-described preform excellent in shape retention while being deformed without wrinkle is hard to undergo the collapse of shape by carrying it, and easy to handle, so that it can be easily placed in a molding tool. Further, since it is excellent in shape retention, the external shape is clear, and positioning is easy when it is placed in a molding tool.

As a method for impregnating a resin, there can preferably be used a method in which after a preform is placed on a one-face mold, it is covered with a film, inside of the space surrounded by the film and molding tool is vacuumed, then a liquid resin is impregnated in the preform under vacuum pressure, or a method that a preform is sandwiched by facing molding tools, and a matrix resin is pressure-impregnated into a mold. Next, a fiber reinforced plastic molded component can be produced by curing or solidifying a resin at a temperature and time suitable for the resin, followed by demolding.

As the matrix resin, it is not particularly limited, for example, thermosetting resins such as an epoxy resin, phenol resin, vinylester resin and unsaturated polyester resin are preferably used. Among these, an epoxy resin can particularly preferably be used because of excellent handling property and mechanical characteristic.

Since the fiber reinforced plastic molded component uses a reinforcing woven fabric excellent in deformability into a curved surface shape or three-dimensional shape, it can be produced with a good productivity even for a complicated three-dimensional shape; further, since it uses a continuous reinforcing fiber, it can exhibit an excellent mechanical characteristic regardless of light weight. Herein, a three-dimensional shape means a shape combined with a plain surface and a curved surface (shape having a branch in cross section is included).

Further, since the reinforcing woven fabric used in the fiber reinforced plastic molded component has features that displacement of weave texture and wrinkle hardly take place, disarray is few in a weave texture pattern characteristic of a fabric substrate appearing on a surface of a fiber reinforced plastic molded component, and a designing property is excellent, and further since an orientation disarray of reinforcing fiber bundles is few, mechanical characteristics are excellent as well. Based on these features, the fiber reinforced plastic molded component can preferably be used for exterior members and structural members requiring a complicated shape, designing property and high mechanical characteristic in applications such as an automobile, airplane, marine vessel, home electric appliance and building,

EXAMPLES

Hereinafter, our fabrics, preforms, components and methods will be explained on the basis of Examples and Comparative Examples.

Example 1

On one surface of a bidirectional fabric substrate, a particulate resin material mainly containing a polyvinyl formal resin was dropped using an emboss roll and a doctor blade while weighing for the mass per unit area to be 5 g/m$^2$, and spread homogeneously. Subsequently, the resin material was stuck on the fabric substrate by passing it under a far-infrared heater at 0.3 m/min set for a surface temperature of the fabric substrate to be 185° C., and a reinforcing woven fabric on that surface the resin material stuck was wound up on a roll.

Here, as the bidirectional fabric substrate, there was used CO6343B produced by Toray Industries, Inc. (weave structure: plain fabric, unit weight of woven fabric: 198 g/m$^2$, thickness: 0.25 mm, warp weaving density: 12.5 yarns/25 mm, weft weaving density: 12.5 yarns/25 mm), the reinforcing fiber bundle used in this bidirectional fabric substrate was a carbon fiber T300-3K produced by Toray Industries, Inc. (number of filaments: 3,000, tensile elastic modulus: 230 GPa, tensile strength 3.5 GPa, fineness: 198 tex, rupture elongation: 1.5%).

Subsequently, this reinforcing woven fabric was wound off from a roll, passed a swing roll capable of swinging in an axial direction at a wrapping angle of 180°, and wound on another roll. The reinforcing woven fabric was intermittently moved from a winding-off side to a winding side, the swing roll was swung during stopping of the intermittent operation, a deformation history was given such that a shearing deformation angle toward the in-plane direction to the reinforcing woven fabric was 30° at the maximum. Then, the reinforcing woven fabric was wound up on a roll when the shearing deformation angle was returned substantially to a 0° state. The surface of this reinforcing woven fabric was observed to find that the resin material was scattered and stuck on the surface of the fabric substrate. Further, no peeling of resin material from the fabric substrate was observed due to giving shearing deformation.

Then, from the reinforcing woven fabric wound up, given that the directions of warp and weft were 0° and 900 respectively, a test piece of 250 mm×45 mm in size was cut out for the 45° direction to be a longitudinal direction. Next, 50 mm each of both ends of this test piece in the longitudinal direction was fixed by a jig, and positioned on a measuring apparatus via jigs of both ends. The reinforcing woven fabric was fixed so that the part fixed by the jig was not deformed in the width direction, and the exposed part between the jigs of both ends was set to be 150 mm in the longitudinal direction and 45 mm in the width direction. Additionally, as the measuring apparatus, an Autograph AGS-100 produced by SHIMADZU CORPORATION was used.

Thereafter, a non fiber axis tensile test where a test piece was stretched via jigs in the longitudinal direction was carried out, a load was continuously measured till the tensile strain of the test piece (corresponding a displacement in tensile test apparatus) reached 5% (corresponding a displacement of 7.5 mm in tensile test apparatus), the relationship between deformation and load of a test piece was obtained. Here, since a variation was thought to be present in the measurement, three test pieces were prepared, each test piece was measured for the maximum loads when strain reached 1% (displacement of 1.5 mm in tensile test apparatus) and 5% (displacement of 7.5 mm in tensile test apparatus) were recorded, and an average of three test pieces was defined as a maximum of load in each tensile strain.

As the result of measurement in this procedure, the maximum value (average of the three pieces) of load provided till the tensile strain reached 1% was 0.24 N, and the maximum value (average of the three pieces) of load provided till the tensile strain reached 5% was 0.5 N.

Subsequently, four rectangles each of 500 mm×400 mm in size were cut from the reinforcing woven fabric. At this time, given that directions of the sides of the rectangle were 0° and 90° respectively, they were two pieces that fiber axis directions were almost 0° and 90° directions and two pieces that the directions were almost ±45°. The reinforcing woven fabrics cut were laid up in such way that only the reinforcing woven fabric for the uppermost surface was set for the surface stuck with a resin material to be on the downside and ones other than which were set for the surface stuck with a resin material to be on the upside. Further, two pieces of uppermost and lowermost were those whose fiber axis directions were 0°/90° directions and two pieces of inner layers were those whose fiber axis directions were ±45° directions. The resulting layered product was placed on a shaping mold heated at 90° C. Here, as the shaping mold, one having a planar size of 450 mm×350 mm, and a groove of 40 mm in depth drawing a curve with a slope angle of 45° was used.

After that, the layered product was sandwiched by the shaping mold and the facing shaping mold heated at 90° C., a pressure of 0.4 MPa was given to the layered product for 5 minutes. Here, it took about 10 seconds from the placement of the layered product on the shaping mold till the layered product being sandwiched by the two shaping molds.

The facing shaping molds were demolded, the layered product cooled by cold blast was taken out from the shaping molds to find that the layered product was deformed in a shape along the shape of the shaping molds and the shape was fixed. No wrinkle occurred on the surface of the layered product provided with the shape. No interlayer of the layered product was peeled, the shape deformed in three-dimension was stable, and no deformation occurred in picking the edge to lift. Namely, in the preform obtained by this method, no wrinkle occurred on the surface and the same shape as the shaping mold was exhibited, further, and no deformation from the shape was excellent, so that it was very preferable as a preform for a fiber reinforced plastic molded component.

This preform was placed in a lower mold of a both-face mold for RTM molding held at 100° C., an upper mold was closed, and air inside the mold was exhausted by a vacuum pump. Next, a liquid epoxy resin was infused in the mold at an infusing pressure of 0.5 MPa, impregnated in the preform and left for 20 minutes. In this way, a fiber reinforced plastic molded component was obtained. Here, as the resin, there was used a liquid epoxy resin obtained by blending a base resin: "Epicote" 828 (produced by Yuka Shell Epoxy K.K.: epoxy resin), and a hardener: Blend TR-C35H produced by Toray Industries, Inc. (imidazole derivative).

In the fiber reinforced plastic molded component obtained, the resin was sufficiently got across overall and cured, and there was no part where the resin was not impregnated and reinforcing fiber bundles were exposed outwards. Further, the molded component had no large displacement in the weave texture of the reinforcing woven fabric which appeared on the surface of molded component, had a smooth surface without wrinkle, and was excellent as a fiber reinforced plastic molded component.

Example 2

The same reinforcing woven fabric as in Example 1 was laid up in the same layered constitution (size: 500 mm×400 mm, the laid-up number: 4).

This layered product was placed on a one-face shaping mold of the same shape as in Example 1 being held at room temperature, then, a silicon rubber sheet of 2 mm thick was covered on the shaping mold and the layered product, the shaping mold and the sheet were sealed with a sealant tape. In this way, a space surrounded by the shaping mold and the sheet became a sealed space in which the layered product was confined. After that, air inside the sealed space was exhausted using a vacuum pump, the layered product was imposed on the shaping mold by atmospheric pressure through the sheet. In this condition, hot water was flown in a pipe arrangement provided in the shaping mold to raise the temperature of the shaping mold to 90° C. and held for 5 minutes. The sheet was taken out from the shaping mold, the layered product cooled by cold blast was taken out from the shaping molds to find that the layered product was deformed in a shape along the shape of the shaping molds and the shape was fixed. No wrinkle occurred on the surface of the layered product provided with the shape. No interlayer of the layered product was peeled, the shape deformed in three-dimension was stable, and no deformation occurred in picking the edge to lift. Namely, in the preform obtained by this method, no wrinkle occurred on the surface and the same shape as the shaping mold was exhibited, further, and no deformation from the shape was excellent, so that it was very preferable as a preform for a fiber reinforced plastic molded component.

Then, a resin was impregnated in this preform and cured in the same way as in Example 1 to obtain a fiber reinforced plastic molded component. In the fiber reinforced plastic molded component obtained, the resin was sufficiently got across overall and cured, and there was no part where the resin was not impregnated and reinforcing fiber bundles were exposed outwards. Further, the molded component had no large displacement in the weave texture of the reinforcing woven fabric which appeared on the surface of molded component, had a smooth surface without wrinkle, and was excellent as a fiber reinforced plastic molded component.

Example 3

A reinforcing woven fabric stuck with resin particles was produced in the same manner as in Example 1 except that the amount of resin material stuck on the surface of a fabric substrate was 10 g/m$^2$, and the same deformation history as in Example 1 was given thereto. The surface of the fiber reinforced plastic molded component obtained was observed to find that the resin material was scattered and stuck on the surface of the fabric substrate. Further, there was no peeling of the resin material from the fabric substrate due to giving a shearing deformation.

A non fiber axis tensile test was carried out for this reinforcing woven fabric in the same manner as in Example 1. As a result, the maximum value (average of the three pieces) of load provided till the tensile strain reached 1% was 0.24 N, and the maximum value (average of the three pieces) of load provided till the tensile strain reached 5% was 0.55 N.

This reinforcing woven fabric was laid up in the same way as in Example 1, and the layered product was deformed in the same way using the same shaping mold as in Example 1. As a result, the layered product was deformed in a shape along the shape of the shaping mold and the shape was fixed. Further, no wrinkle occurred on the surface of the layered product provided with the shape. No interlayer of the layered product was peeled, the shape deformed in three-dimension was stable, and no deformation occurred in picking the edge to lift. Namely, in the preform obtained by this method, no wrinkle occurred on the surface and the same shape as the shaping mold was exhibited, further, and no deformation from the shape was excellent, so that it was very preferable as a preform for a fiber reinforced plastic molded component.

Then, a resin was impregnated in this preform and cured in the same way as in Example 1 to obtain a fiber reinforced plastic molded component. In the fiber reinforced plastic molded component obtained, the resin was sufficiently got across overall and cured, and there was no part where the resin was not impregnated and reinforcing fiber bundles were exposed outwards. Further, the molded component had no large displacement in the weave texture of the reinforcing woven fabric which appeared on the surface of molded component, had a smooth surface without wrinkle, and was excellent as a fiber reinforced plastic molded component.

Example 4

A reinforcing woven fabric was produced in the same manner as in Example 1 except that BT70-20 produced by Toray Industries Inc. (weave structure: plain fabric, unit weight of woven fabric: 213 g/m$^2$, warp weaving density: 3.27 yarns/25 mm, weft weaving density: 3.27 yarns/25 mm) was used in a bidirectional fabric substrate. Additionally, the reinforcing fiber bundle used in this bidirectional fabric substrate was a carbon fiber T700s-12K produced by Toray Industries Inc. (number of filaments: 12,000, tensile elastic modulus: 230 GPa, tensile strength 4.9 GPa, fineness: 800 tex, rupture elongation: 2.1%).

The same deformation history as in Example 1 was given to this reinforcing woven fabric. The surface of the fiber reinforced plastic molded component obtained was observed to find that the resin material was scattered and stuck on the surface of the fabric substrate. Further, there was no peeling of the resin material from the fabric substrate due to giving a shearing deformation.

A non fiber axis tensile test was carried out for this reinforcing woven fabric in the same manner as in Example 1. As a result, the maximum value (average of the three pieces) of load provided till the tensile strain reached 1% was 0.17 N, and the maximum value (average of the three pieces) of load provided till the tensile strain reached 5% was 0.4 N.

This reinforcing woven fabric was laid up in the same way as in Example 1, and the layered product was deformed in the same way using the same shaping mold as in Example 1. As a result, the layered product was deformed in a shape along the shape of the shaping molds and the shape was fixed. No wrinkle occurred on the surface of the layered product provided with the shape. No interlayer of the layered product was peeled, the shape deformed in three-dimension was stable, and no deformation occurred in picking the edge to lift. Namely, in the preform obtained by this method, no wrinkle occurred on the surface and the same shape as the shaping mold was exhibited, further, and no deformation from the shape was excellent, so that it was very preferable as a preform for a fiber reinforced plastic molded component.

Then, a resin was impregnated in this preform and cured in the same way as in Example 1 to obtain a fiber reinforced plastic molded component. In the fiber reinforced plastic molded component obtained, the resin was sufficiently got across overall and cured, and there was no part where the resin was not impregnated and reinforcing fiber bundles were exposed outwards. Further, the molded component had no large displacement in the weave texture of the reinforcing woven fabric which appeared on the surface of molded component, had a smooth surface without wrinkle, and was excellent as a fiber reinforced plastic molded component.

Example 5

A preform was formed in the same way as in Example 1 except that the following was done in laying up a reinforcing woven fabric and deforming the layered product.

As the shaping mold, a shaping mold having a planer size of 450 mm×350 mm, a first concavity of 30 mm in depth drawing a curve with a slope angle of 45°, and further, a second concavity at the bottom of the first concavity, having 30 mm in a depth from the bottom with a slope angle of 45° was used, on which the layered product was placed. The temperature of the shaping mold was set to 90° C. After that, using a part mold of the same shape as the second concavity of the shaping mold being heated at 90° C., the layered product was imposed on the second concavity and pressurized. Thereafter, the facing shaping mold having the same shape as the first concavity was provided, a pressure of 0.4 MPa was given to the layered product entirely including a part not pressurized by the part mold for 5 minutes. It took about 15 seconds from the placement of the layered product on the shaping mold till the facing shaping mold being provided and the whole layered product being pressurized. Thereafter, the facing shaping molds and the part mold were demolded, the layered product cooled by cold blast was taken out from the shaping molds to find that the layered product was deformed in a shape along the shape of the shaping molds having two concavities and the shape was fixed. Further, no wrinkle occurred on the surface of the layered product provided with the shape. No interlayer of the layered product was peeled, the shape deformed in three-dimension was stable, and no deformation occurred in picking the edge to lift. Namely, in the preform obtained by this method, no wrinkle occurred on the surface and the same shape as the shaping mold was exhibited, further, and retention of the shape was excellent, so that it was very preferable as a preform for a fiber reinforced plastic molded component.

Then, a resin was impregnated in this preform and cured in the same way as in Example 1 except that the shape of a shaping mold used in this preform was different to obtain a fiber reinforced plastic molded component. As the shaping mold, one with a shape having a first concavity and a second concavity similar to this preform was used. In the fiber reinforced plastic molded component obtained, the resin was sufficiently got across overall and cured, and there was no part where the resin was not impregnated and reinforcing fiber bundles were exposed outwards. Further, the molded component had no large displacement in the weave texture of the reinforcing woven fabric which appeared on the surface of molded component, had a smooth surface without wrinkle, and was excellent as a fiber reinforced plastic molded component.

Example 6

A reinforcing woven fabric on that surface resin particles stuck was produced in the same manner as in Example 1 except that the amount of resin material stuck on the surface of a fabric substrate was 3 g/m$^2$, and the same deformation history as in Example 1 was given thereto. The surface of the fiber reinforced plastic molded component obtained was observed to find that the resin material was scattered and stuck on the surface of the fabric substrate. Further, there was no peeling of the resin material from the fabric substrate due to giving a shearing deformation.

A non fiber axis tensile test was carried out for this reinforcing woven fabric in the same manner as in Example 1. As a result, the maximum value (average of the three pieces) of load provided till the tensile strain reached 1% was 0.23 N, and the maximum value (average of the three pieces) of load provided till the tensile strain reached 5% was 0.5 N.

This reinforcing woven fabric was laid up in the same way as in Example 1, and the layered product was deformed in the same way using the same shaping mold as in Example 1. As a result, the layered product was deformed in a shape along the shape of the shaping mold and the shape was fixed. Further, no wrinkle occurred on the surface of the layered product provided with the shape. No interlayer of the layered product was peeled, the shape deformed in three-dimension was stable, and no deformation occurred in picking the edge to lift. Namely, in the preform obtained by this method, no wrinkle occurred on the surface and the same shape as the shaping mold was exhibited, further, and retention of the shape was excellent, so that it was very preferable as a preform for a fiber reinforced plastic molded component.

Then, a resin was impregnated in this preform and cured in the same way as in Example 1 to obtain a fiber reinforced plastic molded component. In the fiber reinforced plastic molded component obtained, the resin was sufficiently got across overall and cured, and there was no part where the resin was not impregnated and reinforcing fiber bundles were exposed outwards. Further, the molded component had no large displacement in the weave texture of the reinforcing woven fabric which appeared on the surface of molded component, had a smooth surface without wrinkle, and was excellent as a fiber reinforced plastic molded component.

Comparative Example 1

A reinforced woven fabric (stuck amount of resin material: 5 g/m$^2$) was produced in the same manner as in Example 1 except that no shearing deformation in an in-plane direction was given.

A non fiber axis tensile test was carried out for this reinforcing woven fabric in the same manner as in Example 1. As a result, the maximum value (average of the three pieces) of load provided till the tensile strain reached 1% was 1.5 N, and the maximum value (average of the three pieces) of load provided till the tensile strain reached 5% was 2.2 N.

This reinforcing woven fabric was laid up in the same way as in Example 1, and the layered product was deformed in the same way using the same shaping mold as in Example 1. As a result, on the surface of the layered product deformed, many displacements in the weave texture of the reinforced woven fabric were observed, a lot of wrinkles occurred particularly in the part of a large three-dimensional deformation, and it was not deformed in the same shape as that of the shaping mold. On the other hand, no interlayer of the layered product was peeled, and no deformation occurred in picking the edge to lift. Namely, the preform obtained by this method was excellent in the point of retention of the shape, but a lot of wrinkles occurred on the surface and the shape along the shaping mold was not exhibited, so that it was not suitable for use as a preform for a fiber reinforced plastic molded component.

Then, a resin was impregnated in this preform and cured in the same way as in Example 1 to obtain a fiber reinforced plastic molded component. In the fiber reinforced plastic molded component obtained, the resin was got across almost overall and cured, but in the thickened part of the layered product due to wrinkle, the resin was not sufficiently impregnated, and reinforcing fiber bundles were exposed outwards. Further, the resin layer partially became thick in the periphery, being accompanied with which, the surface came to be not smooth. Further, in the weave texture of the reinforcing woven fabric which appeared on the surface, there was large displacement. Namely, the fiber reinforced plastic molded component obtained was not suitable for use.

Comparative Example 2

The same reinforced woven fabric (stuck amount of resin material: 5 g/m$^2$) as in Comparative Example 1 was laid up in the same layered constitution.

This layered product was deformed in the same way using the same shaping mold as in Example 2. As a result, on the surface of the layered product deformed, many displacements in the weave texture of the reinforced woven fabric were observed, a lot of wrinkles occurred particularly in the part of a large three-dimensional deformation, and it was not deformed in the same shape as that of the shaping mold. On the other hand, no interlayer of the layered product was peeled, and no deformation occurred in picking the edge to lift. Namely, the preform obtained by this method was excellent in the point of retention of the shape, but a lot of wrinkles occurred on the surface and the shape along the shaping mold was not exhibited, so that it was not suitable for use as a preform for a fiber reinforced plastic molded component.

Then, a resin was impregnated in this preform and cured in the same way as in Example 1 to obtain a fiber reinforced plastic molded component. In the fiber reinforced plastic molded component obtained, the resin was got across almost overall and cured, but in the thickened part of the layered product due to wrinkle, the resin was not sufficiently impregnated, and reinforcing fiber bundles were exposed outwards. Further, the resin layer partially became thick in the periphery, being accompanied with which, the surface came to be not smooth. Further, in the weave texture of the reinforcing woven fabric which appeared on the surface, there was large displacement. Namely, the fiber reinforced plastic molded component obtained was not suitable for use.

Comparative Example 3

A reinforced woven fabric (stuck amount of resin material: 10 g/m$^2$) was produced in the same manner as in Example 3 except that no shearing deformation in an in-plane direction was given.

A non fiber axis tensile test was carried out for this reinforcing woven fabric in the same manner as in Example 1. As a result, the maximum value (average of the three pieces) of load provided till the tensile strain reached 1% was 2.6 N, and the maximum value (average of the three pieces) of load provided till the tensile strain reached 5% was 3.5 N.

This reinforcing woven fabric was laid up in the same way as in Example 1, and the layered product was deformed in the same way using the same shaping mold as in Example 1. As a result, on the surface of the layered product deformed, many displacements in the weave texture of the reinforced woven fabric were observed, a lot of wrinkles occurred particularly in the part of a large three-dimensional deformation, and it was not deformed in the same shape as that of the shaping mold. On the other hand, no interlayer of the layered product was peeled, and no deformation occurred in picking the edge to lift. Namely, the preform obtained by this method was excellent in the point of retention of the shape, but a lot of wrinkles occurred on the surface and the shape along the shaping mold was not exhibited, so that it was not suitable for use as a preform for a fiber reinforced plastic molded component.

Then, a resin was impregnated in this preform and cured in the same way as in Example 1 to obtain a fiber reinforced plastic molded component. In the fiber reinforced plastic molded component obtained, the resin was got across almost overall and cured, but in the thickened part of the layered product due to wrinkle, the resin was not sufficiently impregnated, and reinforcing fiber bundles were exposed outwards. Further, the resin layer partially became thick in the periphery, being accompanied with which, the surface came to be not smooth. Further, in the weave texture of the reinforcing woven fabric which appeared on the surface, there was large displacement. Namely, the fiber reinforced plastic molded component obtained was not suitable for use.

Comparative Example 4

A reinforced woven fabric (stuck amount of resin material: 5 g/m$^2$) was produced in the same manner as in Example 4 except that no shearing deformation in an in-plane direction was given.

A non fiber axis tensile test was carried out for this reinforcing woven fabric in the same manner as in Example 1. As a result, the maximum value (average of the three pieces) of load provided till the tensile strain reached 1% was 0.90 N, and the maximum value (average of the three pieces) of load provided till the tensile strain reached 5% was 1.2 N.

This reinforcing woven fabric was laid up in the same way as in Example 1, and the layered product was deformed in the same way using the same shaping mold as in Example 1. As a result, on the surface of the layered product deformed, many displacements in the weave texture of the reinforced woven fabric were observed, a lot of wrinkles occurred particularly in the part of a large three-dimensional deformation, and it was not deformed in the same shape as that of the shaping mold. On the other hand, no interlayer of the layered product was peeled, and no deformation occurred in picking the edge to lift. Namely, the preform obtained by this method was excellent in the point of retention of the shape, but a lot of wrinkles occurred on the surface and the shape along the shaping mold was not exhibited, so that it was not suitable for use as a preform for a fiber reinforced plastic molded component.

Then, a resin was impregnated in this preform and cured in the same way as in Example 1 to obtain a fiber reinforced plastic molded component. In the fiber reinforced plastic molded component obtained, the resin was got across almost overall and cured, but in the thickened part of the layered product due to wrinkle, the resin was not sufficiently impregnated, and reinforcing fiber bundles were exposed outwards. Further, the resin layer partially became thick in the periphery, being accompanied with which, the surface came to be not smooth. Further, in the weave texture of the reinforcing woven fabric which appeared on the surface, there was large displacement. Namely, the fiber reinforced plastic molded component obtained was not suitable for use.

Comparative Example 5

A non fiber axis tensile test was carried out for the same bidirectional fabric substrate as in Example 1 without sticking a resin material and giving any shearing deformation in an in-plane direction in the same way as in Example 1. As a result, the maximum value (average of the three pieces) of load provided till the tensile strain reached 1% was 0.22 N, and the maximum value (average of the three pieces) of load provided till the tensile strain reached 5% was 0.45 N.

This fabric substrate was laid up in the same way as in Example 1, and the layered product was deformed in the same way using the same shaping mold as in Example 1. Additionally, direction in laying up is not concerned because no resin material is stuck on this fabric substrate.

When the facing shaping molds were demolded, the layered product was deformed in a shape along the shape of the shaping mold. The layered product cooled by cold blast was taken out from the shaping mold, but the interlayer of the layered product was not bonded at all, the shape of layered product was collapsed and the shape along the shaping mold was not able to be retained at all.

In this method, although a fabric substrate was deformed in a three-dimensional shape, the shape was not able to be retained because of no adhesion of the interlayer, so that it was not suitable for use as a preform for a fiber reinforced plastic molded component.

Comparative Example 6

A reinforcing woven fabric on that surface resin particles stuck was produced in the same manner as in Example 1 except that the amount of resin material stuck on the surface of a bidirectional fabric substrate was 60 g/m², and the same deformation history as in Example 1 was given thereto. The surface of the reinforcing woven fabric obtained was observed to find that there were a lot of adjacent dotted forms of resin material bonded together, and the surface of the fabric substrate was widely covered with the resin material. Further, there was no peeling of the resin material from the fabric substrate due to giving a shearing deformation.

A non fiber axis tensile test was carried out for this reinforcing woven fabric in the same manner as in Example 1. As a result, the maximum value (average of the three pieces) of load provided till the tensile strain reached 1% was 1.3 N, and the maximum value (average of the three pieces) of load provided till the tensile strain reached 5% was 2.1 N.

This reinforcing woven fabric was laid up in the same way as in Example 1, and the layered product was deformed in the same way using the same shaping mold as in Example 1. As a result, on the surface of the layered product deformed, many displacements in the weave texture of the reinforced woven fabric were observed, a lot of wrinkles occurred particularly in the part of a large three-dimensional deformation, and it was not deformed in the same shape as that of the shaping mold. No interlayer of the layered product was peeled, and no deformation occurred in picking the edge to lift. Namely, the preform obtained by this method was excellent in the point of retention of the shape, but a lot of wrinkles occurred on the surface and the shape along the shaping mold was not exhibited, so that it was not suitable for use as a preform for a fiber reinforced plastic molded component.

Then, a resin was impregnated in this preform and cured in the same way as in Example 1 to obtain a fiber reinforced plastic molded component. In the fiber reinforced plastic molded component obtained, although the resin was partially impregnated and cured, there are many parts where the resin was not got across and reinforcing fiber bundles were exposed outwards, so that it was not suitable for use as a fiber reinforced plastic molded component.

INDUSTRIAL APPLICABILITY

By using the reinforcing woven fabric, it is possible to shape efficiently and well even in a member having a three-dimensional shape, as a result, it becomes possible to improve the productivity and appearance quality of a fiber reinforced plastic molded component. Therefore, it can be applied widely in the fields of automobile, airplane, marine vessel, home electric appliance, office automation equipment, building material and the like. As a matter of course, the application is not limited thereto.

The invention claimed is:

1. A reinforcing woven fabric comprising a resin material stuck on at least one surface of a fabric substrate containing a plurality of reinforcing fiber bundles, wherein the resin material is 1) adhered only on a part of the plurality of reinforcing fiber bundles, and 2) peeled from a remaining part of the plurality of reinforcing fiber bundles, and the maximum value of load till a tensile strain in a non fiber axial tensile test reaches 1% is in a range of 0.01 to 0.75 N.

2. The reinforcing woven fabric according to claim 1, wherein the maximum value of load till a tensile strain in a non fiber axial tensile test reaches 5% is in a range of 0.1 to 1.0 N.

3. The reinforcing woven fabric according to claim 1, wherein the stuck amount of the resin material is 1 to 50 g/m².

4. The reinforcing woven fabric according to claim 1, wherein the resin material mainly comprises a thermoplastic resin.

5. The reinforcing woven fabric according to claim 1, wherein the fabric substrate is a bidirectional fabric.

6. The reinforcing woven fabric according to claim 1, wherein the reinforcing fiber bundle is a carbon fiber bundle.

7. A preform comprising at least one layer of the reinforcing woven fabric according to claim 1.

8. A fiber reinforced plastic molded component, wherein a matrix resin is impregnated in the preform according to claim 7.

9. A reinforcing woven fabric comprising a resin material stuck on at least one surface of a fabric substrate containing a plurality of reinforcing fiber bundles, wherein the resin material is
   1) adhered only on a part of the plurality of reinforcing fiber bundles, and
   2) peeled from a remaining part of the plurality of reinforcing fiber bundles and the resin material peeled from the remaining part of the plurality of the reinforcing fiber bundles remains extended over and not adhered to the remaining part of the plurality of the reinforcing fiber bundles, and
   the maximum value of load till a tensile strain in a non fiber axial tensile test reaches 1% is in a range of 0.01 to 0.75 N.

* * * * *